United States Patent [19]

Isaka

[11] Patent Number: 5,740,373
[45] Date of Patent: Apr. 14, 1998

[54] PACKET SWITCHING SYSTEM HAVING COMMUNICATION CONTROL UNIT FOR SENDING ACKNOWLEDGMENT TO THE SOURCE UPON RECEIVING THE RECEIVE RESPONSE DATA ASSOCIATED WITH THE LAST CELL

[75] Inventor: Masazumi Isaka, Tokyo, Japan

[73] Assignee: Oki Electric Industry Co., Ltd., Tokyo, Japan

[21] Appl. No.: 509,901

[22] Filed: Aug. 1, 1995

[30] Foreign Application Priority Data

Aug. 2, 1994 [JP] Japan ................................. 6-181589

[51] Int. Cl.⁶ ............................................. G06F 13/42
[52] U.S. Cl. ........................... 395/200.67; 395/182.02; 395/182.16; 395/800.3; 395/285; 395/286; 395/854; 395/898; 370/389; 370/395
[58] Field of Search ................... 395/200.11, 200.14, 395/200.15, 200.17, 200.67, 182.02, 182.16, 800.3, 285, 286, 854, 898; 370/428, 218, 226, 236, 349, 352, 400, 394, 353, 354, 355, 395, 389; 340/825.02

[56] References Cited

U.S. PATENT DOCUMENTS

| | | | |
|---|---|---|---|
| 4,135,060 | 1/1979 | Heckel et al. | 370/522 |
| 4,241,398 | 12/1980 | Carll | 395/200.66 |
| 4,707,828 | 11/1987 | Yamada | 370/447 |
| 4,998,244 | 3/1991 | Lee et al. | 370/439 |
| 4,999,834 | 3/1991 | Leo et al. | 370/241 |
| 5,068,785 | 11/1991 | Sugiyama | 395/285 |
| 5,222,061 | 6/1993 | Doshi et al. | 370/394 |
| 5,235,595 | 8/1993 | O'Dowd | 370/392 |
| 5,237,564 | 8/1993 | Lespagnol et al. | 370/398 |
| 5,343,469 | 8/1994 | Ohshima | 370/431 |
| 5,386,412 | 1/1995 | Park et al. | 370/270 |
| 5,448,561 | 9/1995 | Kaiser et al. | 370/471 |
| 5,455,568 | 10/1995 | Ichihashi et al. | 340/825.02 |
| 5,497,461 | 3/1996 | Matsumoto et al. | 395/185.06 |
| 5,550,826 | 8/1996 | Tanaka et al. | 370/450 |
| 5,551,068 | 8/1996 | Goldsmith et al. | 455/89 |
| 5,588,000 | 12/1996 | Rickard | 370/428 |

FOREIGN PATENT DOCUMENTS

| | | |
|---|---|---|
| 0 214 020 | 11/1987 | European Pat. Off. . |
| 4-290034 | 10/1992 | Japan . |
| 5-37564 | 2/1993 | Japan . |
| 92 17014 | 10/1992 | WIPO . |

OTHER PUBLICATIONS

Comer, Douglas E., Internetworking with TCP/IP, "Internet Protocol: Connectionless Datagram Delivery," 1991, pp. 89–107.

Primary Examiner—Meng-Ai T. An
Attorney, Agent, or Firm—Spencer & Frank

[57] ABSTRACT

In a packet switching system, a source node divides a variable length packet into a plurality of cells having a predetermined length, and sequentially sends the cells toward a destination node via a first bus controller accommodating the source node, an ATM (Asynchronous Transfer Mode) switch, and a second bus controller accommodating the destination node. The second bus controller detects and stores the last cell from the source node. The destination node generates receive response data for every incoming cell by hardware control to show whether or not the cell has been normally received, and returns the response data to the second bus controller. In response, the second bus controller generates a response cell by hardware control and returns it to the source node via the ATM switch and first bus controller. This allows the source node to determine rapidly whether or not the receipt at the destination node is normal cell by cell.

18 Claims, 19 Drawing Sheets

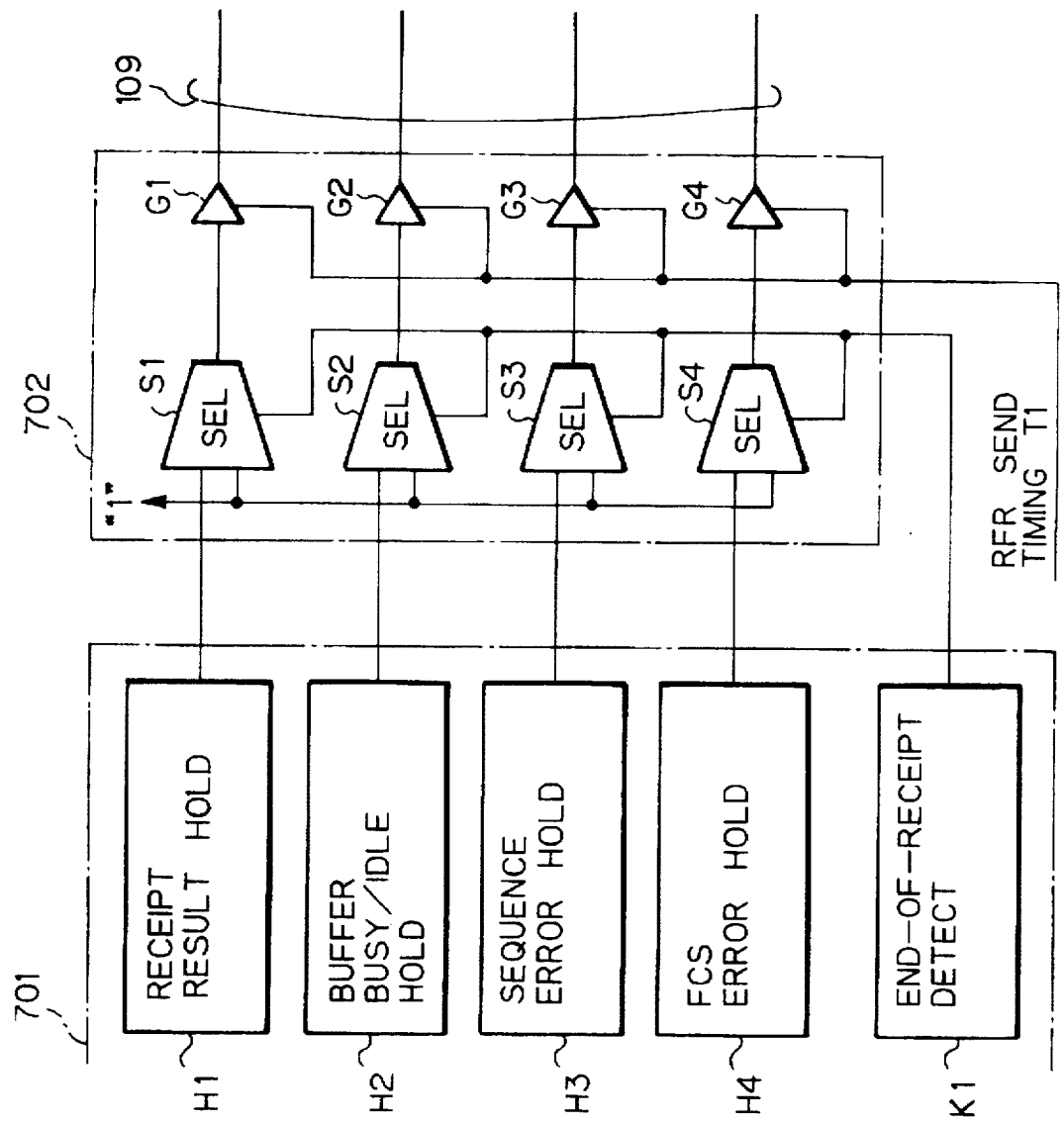

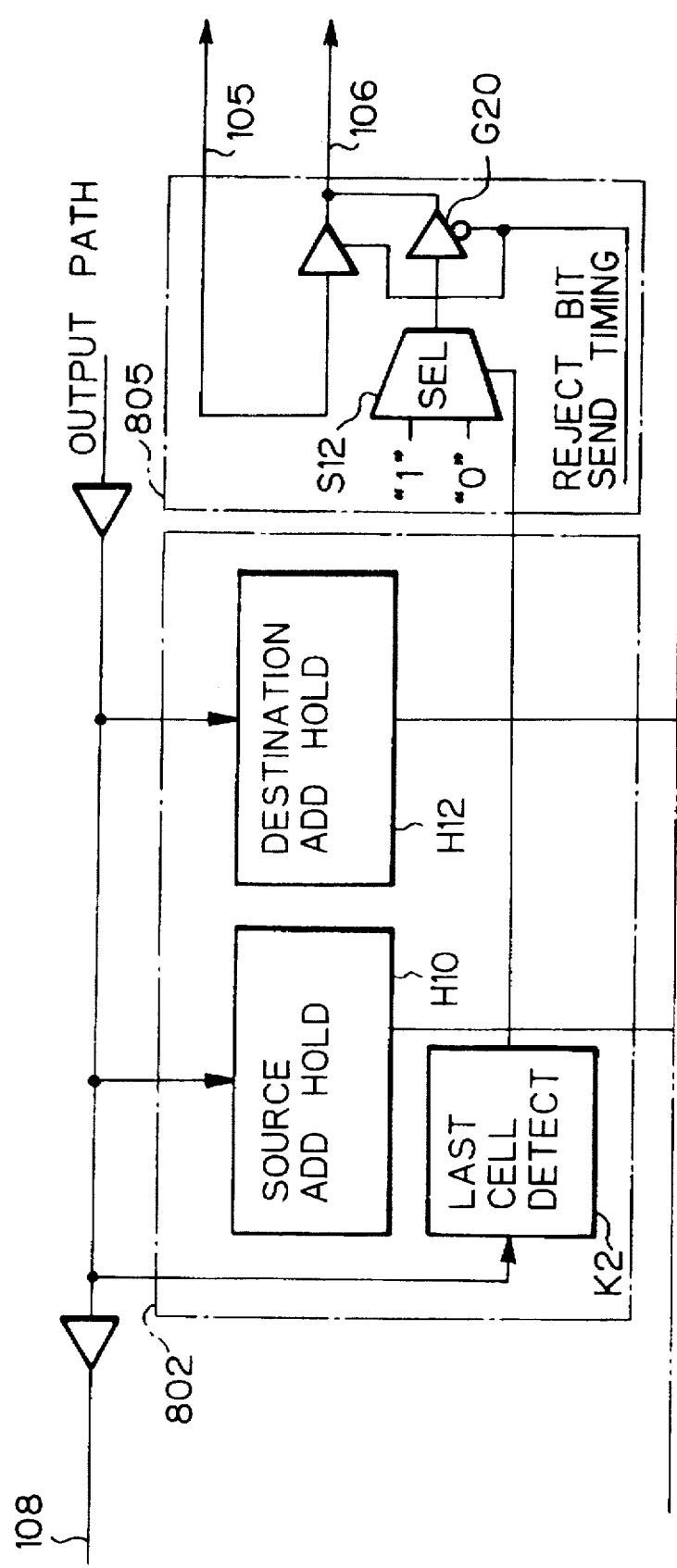

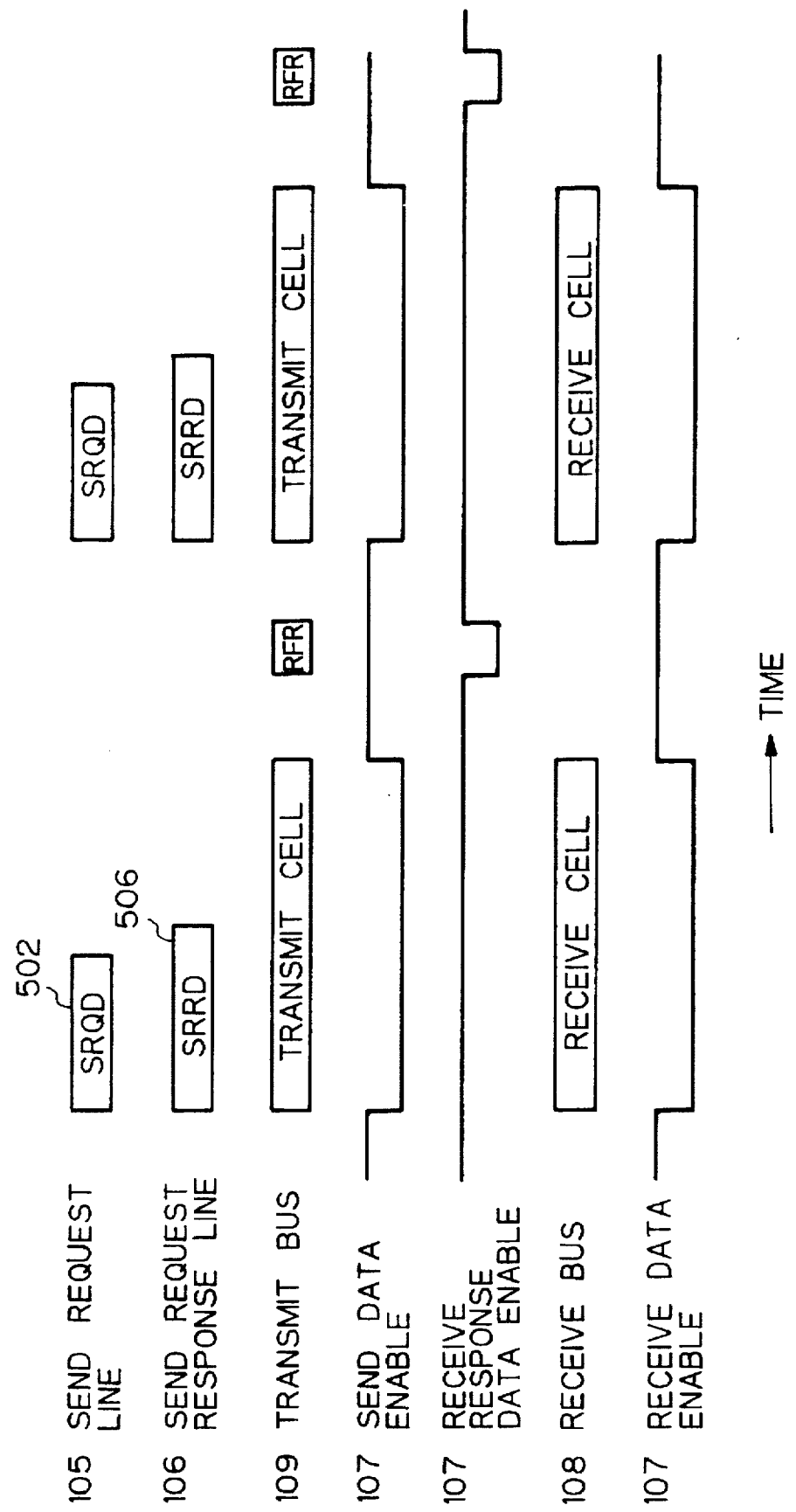

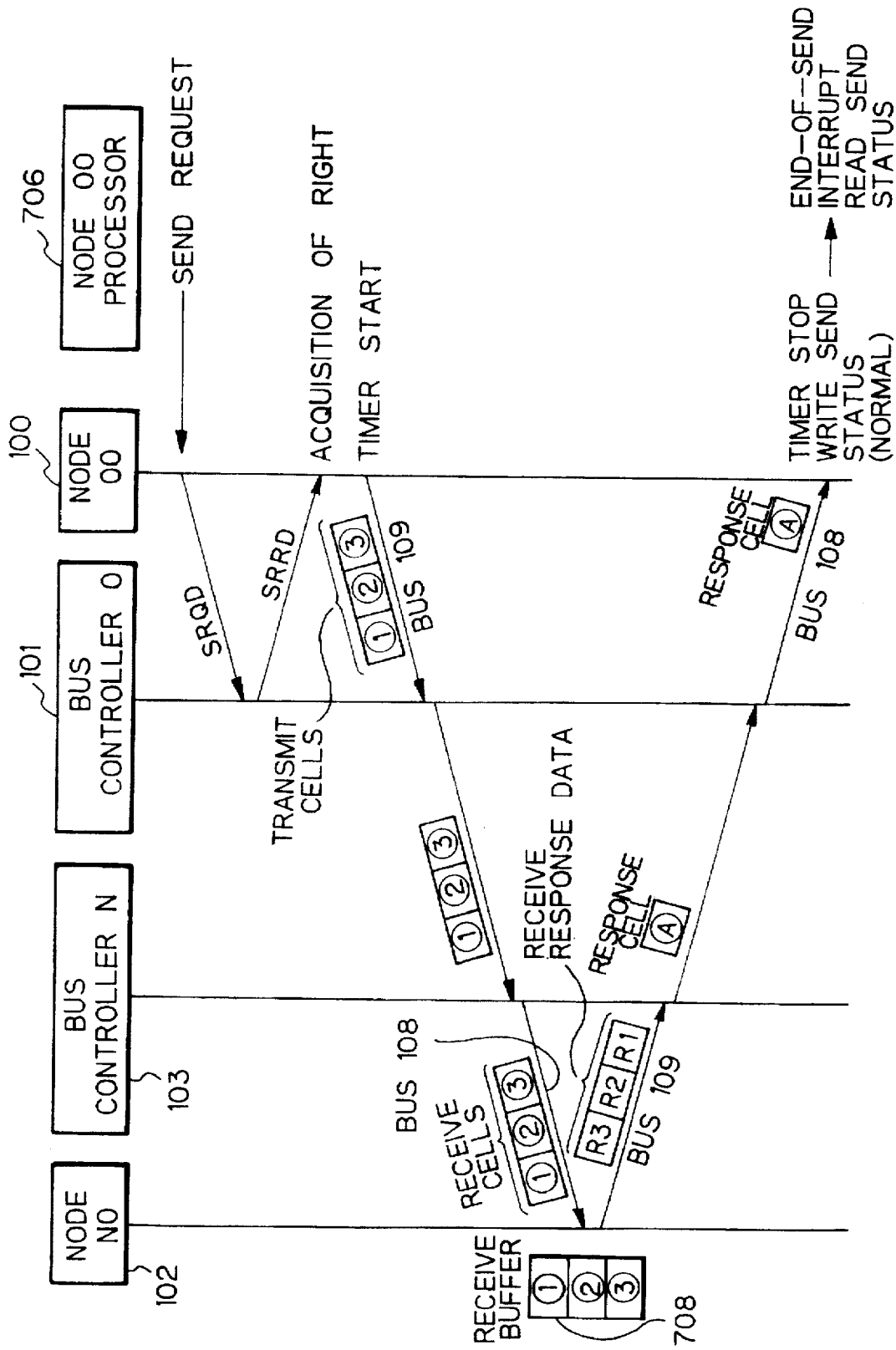

PACKET SWITCHING SYSTEM HAVING COMMUNICATION CONTROL UNIT FOR SENDING ACKNOWLEDGMENT TO THE SOURCE UPON RECEIVING THE RECEIVE RESPONSE DATA ASSOCIATED WITH THE LAST CELL

BACKGROUND OF THE INVENTION

1. Field of the Invention

The present invention relates to a packet switching system for allowing packetized data to be switched to data terminals and, more particularly, to a packet switching system feasible for a public communications network, LAN (Local-Area Network) or similar packet switching network.

2. Description of the Background Art

A current trend in the public telecommunications art is toward a digital network as distinguished from a traditional analog network. A private network or LAN is now spreading among business and other environments because it allows various kinds of data terminals to be connected thereto. For this kind of digital network, use may advantageously be made of a packet switching system in which data are divided into packets each having a predetermined length and switched to data terminals.

It has been customary with a packet switching system to use a store and forward type packet switch. Basically, this kind of switch receives bit-serial packet data from a line, reconstructs them on a byte basis, stores the reconstructed data in a memory, decodes a packet header including a destination, and then sends the data over a particular line. Such a packet store and transfer procedure is repeated in the network, thereby sending data to the destination. The packet has a variable length of up to 4 kilobytes, as prescribed by CCITT (Comite Consultatif International Telegraphique et Telephonique) Recommendation X.25. Further, the store and forward type packet switch executes storage and transfer under the control of a respective control processor storing control sequences.

Specifically, packet data from a line are input to the packet switch bit-serially while being wrapped inside flags. The serial data are reconstructed into characters under the control of the control processor and then written to the memory by a direct memory access (DMA) scheme. At the same time, protocol processing of X.25, Layer 2 is executed for per-packet error control under the control of the processor. Subsequently, the processor analyzes numbers included in packet headers and representative of respective destinations, and numbers also included in the packet headers and representative of the sequence of the packets. The packets are transferred in the network on the basis of control data, and brought to a packet switch accommodating a destination terminal. When the packet traffic in the network is heavy, packets are transferred to the expected switch by way of relaying switches. The packets sometimes arrive at the terminating switch in the reverse order due to a roundabout routing or a resend correction. Then, the processor of the terminating switch rearranges the packets on the basis of the sequence numbers included in their headers (order control). As a result, the packets are transferred to the destination in a correct order. In this manner, the packet switch has customarily processed incoming packets mainly under the program control of the control processor.

Today, B-ISDNs (Broad-band Integrated Services Digital Networks) including public networks, regional networks and private networks are under development. An ATM (asynchronous transfer mode) switching system is attracting attention as a switching system feasible for B-ISDNs. The ATM switching system packetizes data into frames, or cells, having a fixed data length even shorter than the length of the conventional packets. This system transfers the cells by high-speed switching and is a packet mode technology which can be integrated with the existing line switching mode.

The conventional packet switching systems described above have some issues yet to be solved, as follows. Because the packet input and output processing is executed by the program control of the control processor, the packet processing ability cannot be increased due to the conflict between the command speed of the processor and the access to the memory. Hence, when the packet switch is connected to an ATM or similar high-speed switching network, the delay time particular to the switch is too great to make the most of the advantages of the ATM switching system. Further, in an integrated packet switch capable of switching voice, data, pictures and so forth, processing is not practical without resorting to an ultrahigh-speed processor and an ultrahigh-speed memory.

To eliminate the above problems, the applicant of the present invention has already proposed a high-speed packet switching system relying on program control little, as disclosed in Japanese Patent Laid-Open Publication Nos. 290034/1992 and 37564/1993. The system further divides the packet prescribed by X.25 into frames, or cells, having a fixed length, and switches packets on a cell basis by hardware processing. This kind of system achieves desirable real-time switching and is connectable even to an ATM switching network. However, the system is not fully satisfactory in the following respect. When the cells of fixed length are not fully received in the expected manner, a resend request is sent to the calling party or source. At this instant, if the resend request is sent by processor control similar to the conventional program control, it needs a substantial period of time and adversely influences the other high-speed transmission and receipt procedures.

SUMMARY OF THE INVENTION

It is, therefore, an object of the present invention to provide a packet switching system which allows, when a variable length packet is sent in the form of cells of fixed length by hardware, a resend request to be sent surely and rapidly.

In accordance with the present invention, in a packet switching method for producing, at a source node, a plurality of cells having a fixed length by dividing variable length data to be sent into pieces of data, and adding a header, including a destination code, a source code and a sequence code, to each of the pieces of data, and sequentially sending the cells to a destination node via a communication control unit which controls lines, and reconstructing, at the destination node, the variable length data from the cells, the sequence code is detected when the cells meant for the destination node each arrives at the communication control unit. The last cell is detected on the basis of the sequence code, and stored in the communication control unit. When the cells each arrives at the destination node, receive response data indicative of whether or not the cell has been normally received is generated. The plurality of receive response data are sequentially returned to the communication control unit. At the communication control unit, the receive response data are sequentially stored. In response to the receive response data associated with the last cell, a response cell indicative of the receipt state of the cells at the destination node is generated at the communication control unit on the basis of the contents of the receive response data and the last cell stored beforehand. At the source node, the receipt state represented by the response cell is written to a memory, and a control processor is informed of whether or not the cells have been sent normally.

Also, in accordance with the present invention, a packet switching system has a communication control unit, and a plurality of nodes connected to and controlled by the communication control unit via lines, and capable of switching packets via the communication control unit. The nodes each have a control processor for controlling a transmission procedure and a receipt procedure, a data memory for storing variable length data to be transmitted and received data, a packet transmitting circuit for reading the variable length data out of the data memory, for dividing the variable length data into pieces of data having a fixed length, for adding a header, including a destination code, a source code and a sequence code, to each of the pieces of data to thereby form a plurality of cells having a fixed length, and for sending the cells, a packet receiving circuit for latching, on receiving a plurality of cells, by hardware to thereby reproduce data of original format, and for writing the data of original format in the data memory, and a receive response data transmitting circuit for generating, for every cell received by the packet receiving circuit, receive response data indicative of whether or nor the cell has been received normally, and for sending the receive response data. The communication control unit has a last cell storage for storing the last one of the cells sequentially received from a source node, a receive response data storage for storing the receive response data sent from the receive response data transmitting circuit of a destination node, and a response cell transmitting circuit for generating, based on data stored in the receive response data storage and last cell storage, a response cell including the content of the receive response data, and for sending the response cell. The packet transmitting circuit of each node writes, on receiving the response cell from the communication control unit after the transmission of the cells, a receipt state at the destination node and included in the response cell in the data memory, and reports the control processor whether or not the transmission has ended normally.

BRIEF DESCRIPTION OF THE DRAWINGS

The objects and features of the present invention will become more apparent from the consideration of the following detailed description taken in conjunction with the accompanying drawings in which:

FIG. 9 is a schematic block diagram showing part of a packet reconstructing circuit and a receive response data generating circuit shown in FIG. 7 in detail;

FIG. 10 shows how FIGS. 10A and 10B are connected;

FIGS. 10A and 10B are, when combined as shown in FIG. 10, a block diagram schematically showing part of the bus controller shown in FIG. 8;

FIG. 11 is a timing chart showing signals appearing on buses included in the embodiment;

FIGS. 12, 13 and 14 are charts each demonstrating a particular operation of the embodiment;

DESCRIPTION OF THE PREFERRED EMBODIMENTS

Figure 1:
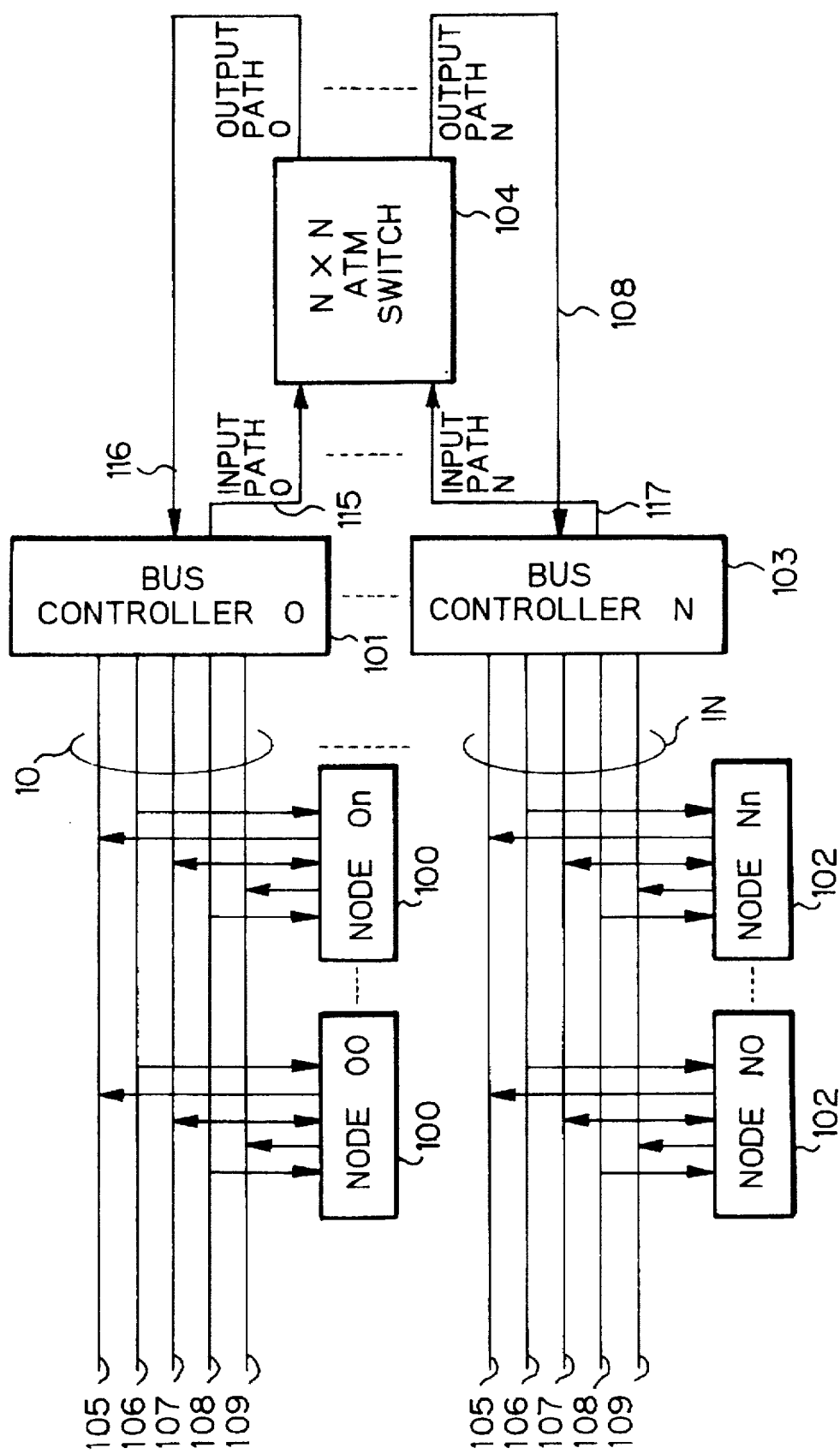
FIG. 1 is a block diagram schematically showing a packet switching system embodying the present invention.

Referring to FIG. 1 of the drawings, a packet switching system embodying the present invention is shown. As shown, the system has bus groups 10–1N and bus controllers (0–N) 101–103 for controlling the bus groups 10–1N, respectively. The bus groups 10–1N are each made up of a send request line 105, a send request response line 106, a control signal line 107, a receive bus 108, and a transmit bus 109. A plurality of nodes (00–Nn) 100–102 are respectively connected to the bus groups 10–1N, as illustrated. The bus controllers 101–103 are connected to an N x N ATM packet switch 104 which switches packets asynchronously. In the illustrative embodiment, the nodes 100–102 each divides data having a variable length into data having a fixed length, i.e., cells by hardware control and sequentially sends them to a destination node, or each reproduces original data from cells received from a source node by hardware control.

Figure 2:
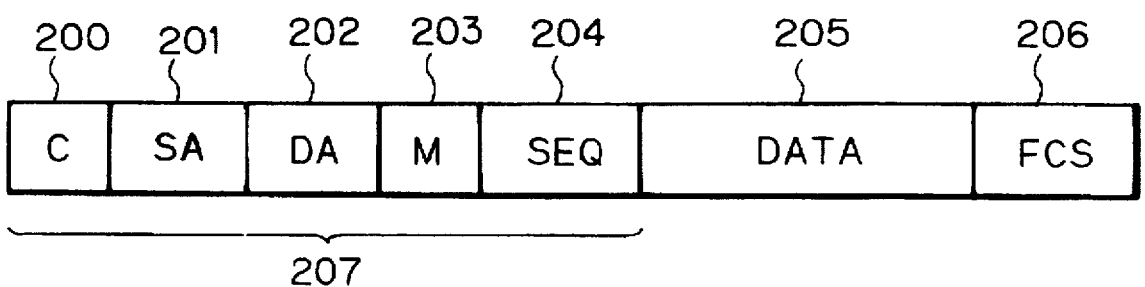
FIG. 2 shows a specific format of a cell to be switched and applicable to the embodiment.

FIG. 2 shows a specific format of a single cell applicable to the embodiment. As shown, the cell has a cell header 207, a data field (DATA) 205, and a frame check sequence field (FCS) 206. The cell header 207 is made up of a cell identifier (C) 200, a source address (SA) 201, a destination address (DA) 202, more bits (M) 203, and a sequence number (SEQ) 204. The cell identifier 200 is (logical) "1" when the cell is a cell to be transmitted or a received cell, thereby distinguishing it from a response cell which will be described. The source address 201 is representative of one of the numbers 00–Nn assigned to the source node. Likewise, the destination address 202 is representative of one of the numbers 00–Nn assigned to the destination node. In the case where a packet is switched in the form of a plurality of cells, the more bits 203 are representative of a code for distinguishing the leading cell, intervening cell, and trailing cell. The code is "01" for the leading cell, "00" for the intervening cell, or "11" for the trailing cell. In the event when a packet to be sent is divided into a plurality of cells, the sequence number 204 is given to each cell in accordance with the order of transmission. The data 205 is the payload of each cell derived from a single packet. The FCS field 206 stores check bits resulting from calculations performed with the consecutive bits of the cell header 207 and those of the data 205 by, for example, the cyclic redundancy check scheme.

Figure 5:
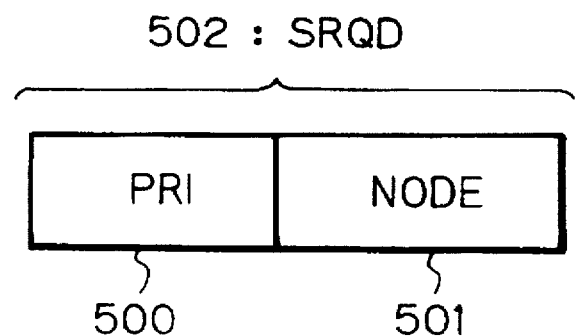
FIG. 5 shows specific send request data applicable to the embodiment.
Figure 6:
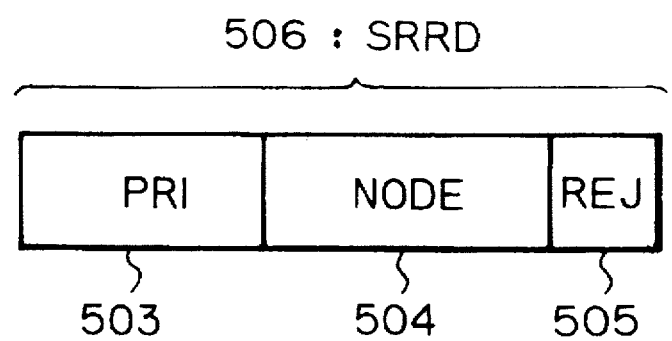
FIG. 6 shows specific send request response data applicable to the embodiment.

Referring again to FIG. 1, a send request signal is sent from, for example, the node 100 or 102 to the bus controller 101 or 103 over the send request line 105. In response to the request signal, a response signal is returned from the bus controller 101 or 103 to the source node 100 or 102 over the send request response line 106. Cells, each having a fixed length, are sequentially sent from the source node 100 or 102 to the bus controller 101 or 103 over the transmit bus 109. Incoming cells are sent from the bus controller 101 or 103 to a destination node 100 or 102 over the receive bus 108. Further, enable signals, or bus control signals, are fed over the bus control signal line 107 in order to control the buses 108 and 109, as will be described specifically later. As shown in FIG. 5 specifically, the send request signal is implemented as send request data (SRQD) 502 consisting of a priority counter (PRI) 500 representative of a priority order, and a node number (NODE) 501 representative of the node originating the send request. As shown in FIG. 6, the send request response signal is implemented as send request response data (SRRD) 506 consisting of a priority counter (PRI) 503, a node number (NODE) 504, and a reject bit (REJ) 505.

Briefly, the nodes 100–102 each has packet transmission circuitry for producing cells of fixed length from data of variable length and sequentially outputting them to the transmit bus 109, and packet receipt circuitry for receiving such cells via the receive bus 108. The nodes 100 and 102 are each connected to a respective packet terminal or packet line, not shown, to receive packets of variable length therefrom.

Figure 7:
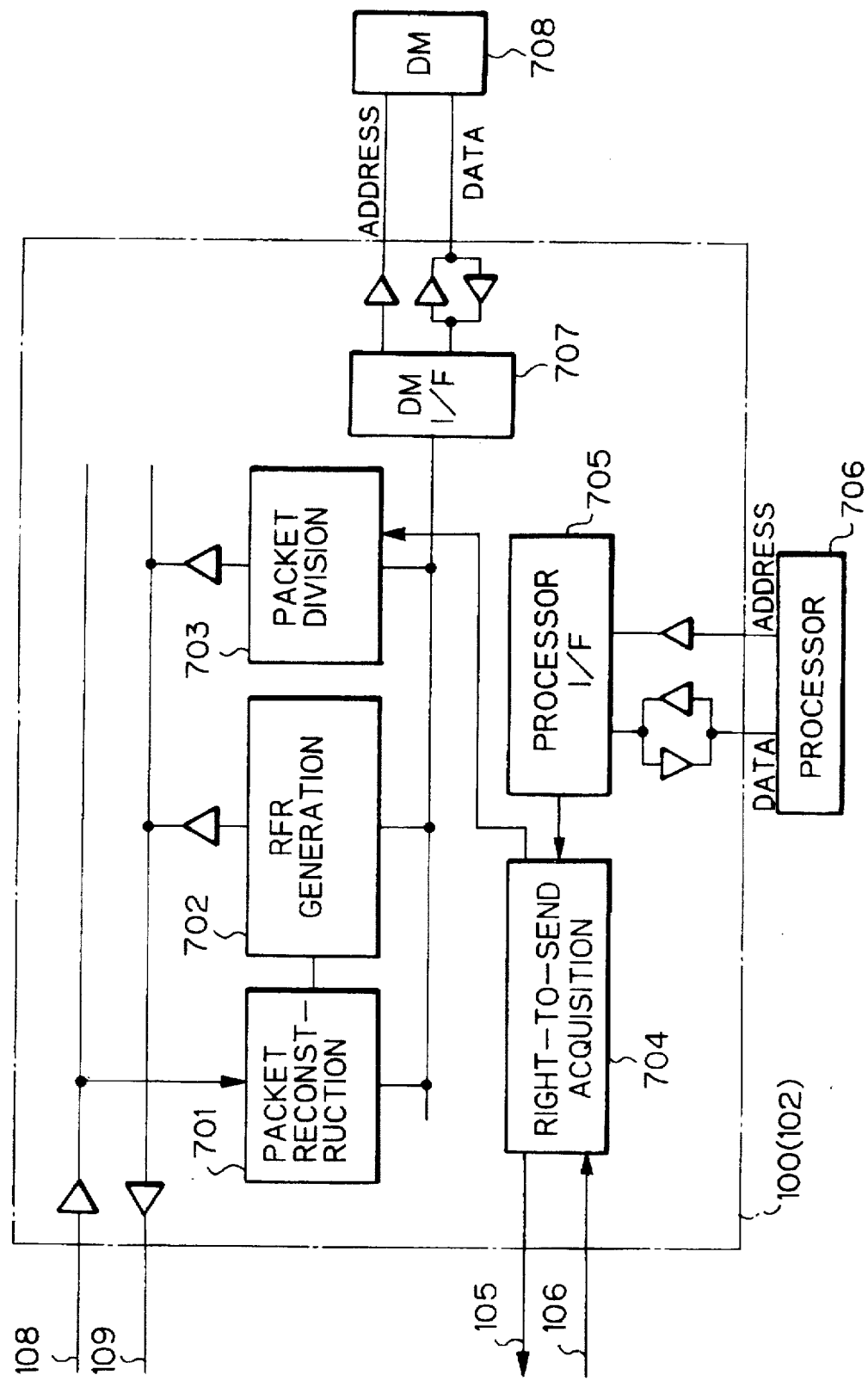
FIG. 7 is a block diagram schematically showing a node included in the embodiment in detail.

Specifically, as shown in FIG. 7, the nodes 100–102 each has a packet reconstruction unit 701, a receive response data (RFR) generation unit 702, a packet division unit 703, a right-to-send acquisition unit 704, a processor 706 for control, a processor interface (I/F) 705, a data memory (DM) 708, and a DM I/F 707. The packet reconstruction unit 701 receives cells coming in on the receive bus 108 and writes them in a receive buffer, included in the DM 708, via the DM I/F 707. For the packet reconstruction unit 701, use may be made of a packet receiving device taught in Japanese Patent Laid-Open Publication No. 37564/1993 by way of example. The packet receiving device separates a header and data constituting each received cell of fixed length, and writes the data in the DM 708 while latching a plurality of information from the header. The device generates reproduced data by hardware on the basis of the latched information, thereby reconstructing a packet having the original format in the DM 708. As shown in FIG. 9, in the illustrative embodiment, the packet reconstruction unit 701 has a receipt result hold circuit H1, a buffer busy/idle hold circuit H2, a sequence error hold circuit H3, an FCS error hold circuit H4, and an end-of-receipt detecting circuit K1. The hold circuit H1 selectively holds a bit "0" or "1" indicative of whether receipt was successful or not. The hold circuit H2, like the hold circuit H1, holds a particular bit indicative of whether the receive buffer is busy or not. The hold circuit H3 holds the result of sequence error detection. The hold circuit H4 holds the result of FCS calculation. The detecting circuit K1 detects the end of detection cell by cell. The outputs of the hold circuits H1–H4 are fed to the RFR generation unit 702 together with the output of the circuit K1.

Figure 3:
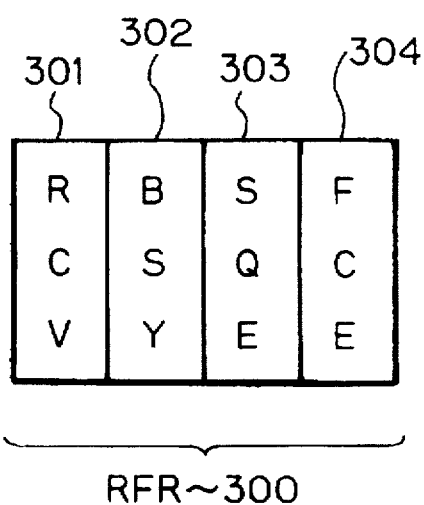
FIG. 3 shows specific receive response data applicable to the embodiment.

On receiving information on the result of receipt from the packet reconstruction unit 701, the RFR generation unit 702 generates receive response data RFR indicative of whether or not the receipt is normal cell by cell, and then sends it to the transmit bus 109. As shown in FIG. 9, the generation unit 702 has a plurality of selectors S1–S4 and a plurality of switching gates G1–G4 and generates the data RFR only with hardware. The hold circuits H1–H4 of the packet reconstruction 701 are connected to one input of the selectors S1–S4, respectively. The outputs of the selectors S1–S4 are respectively connected to the bit lines of the transmit bus 109 via the switching gates G1–G4. The other inputs of the selectors S1–S4 are used to generate, when an error is detected in the leading cell or any intervening cell, receive response data ("1" throughout the bits) for discarding the leading or intervening cell and the following cell or cells. When the receipt of each cell is normal as determined by the detecting circuit K1, the selectors S1–S4 respectively select the outputs of the hold circuits H1–H4. The switching gates G1–G4 are turned on by a transmit timing signal T1 with the result that receive response data RFR is output to the transmit bus 109. As shown in FIG. 3, the data RFR, labeled 300, has a normal receipt bit (RCV) 301, a buffer busy (BSY) bit 302, a sequence error (SQE) bit 303, and a frame check sequence error (FCE) bit 304.

The packet division unit 703 reads data to be sent out of a transmit buffer, included in the DM 708, via the DM I/F 707, divides the data into cells each having a fixed length, and then outputs the cells to the transmit bus 109. Japanese Patent Laid-Open Publication No. 290034/1992, for example, discloses a packet switching system including transmission circuitry which is advantageously applicable to the packet division unit 703. The packet switching system stores information relating to headers in a plurality of storing means, sequentially adds headers to divided data on the basis of the stored information, and thereby forms cells to be transmitted. In the embodiment, the packet division unit 703 includes a response timer circuit. When the last cell from the packet division 705 is sent after the acquisition of the transmission right, the timer circuit starts a timer thereof. When a response cell meant for the sequence of cells sent is received by the packet reconstruction unit 701, the timer circuit stops the timer. If the response cell is not received within a predetermined period of time as counted by the timer, the packet division unit 703 writes a time-out status in the DM 708 via the DM I/F 707, causes an end-of-transmission interrupt to occur for thereby completing the transmission, and then causes the same data to be sent again later.

The right-to-send acquisition unit 704 delivers a send request to the associated bus controller 101 or 103 when data to be sent are generated in the node. Specifically, on receiving a send request from the processor 706 via the processor I/F 705, the acquisition unit 704 generates send request data SRQD and sends it over the send request line 105. Subsequently, when the acquisition unit 704 receives send request response SRRD over the send request response line 106, it compares the data SRRD 506 with the data SRQD 502 to see if the transmission right has been acquired or not. If the right has been acquired, the acquisition 704 delivers a transmission enable signal to the packet division 703.

The processor I/F 705 transfers control signals from the processor 706 to various sections constituting the node. The processor 706 is a processing unit for controlling the entire node. In the illustrative embodiment, when data to be transmitted are present in the DM 708, the processor 706 feeds a send request to the right-to-send acquisition unit 704 and packet division unit 703. When the end-of-transmission interrupt is generated by the packet division unit 703, the processor 706 reads a transmission status to see if the packet designated by the send request has been successfully received or not.

The DM I/F 707 transfers received data from the packet reconstruction 701 to the DM 708 or reads data to be transmitted out of the DM 707 and delivers them to the packet division 703.

As shown in FIG. 1, the bus controllers 101 and 103, for example, each receives send requests from the nodes 100 or 102 connected to its own buses 10 or IN, determines the order of the send requests, and then controls the buses 10 or IN. Also, each bus controller 101 or 103 transfers cells of fixed length from the ATM switch 104 to designated ones of the nodes 100 or 102 over the buses 10 or IN. In this sense, the bus controllers 101 and 103 each plays the role of a communication control unit.

Figure 8:
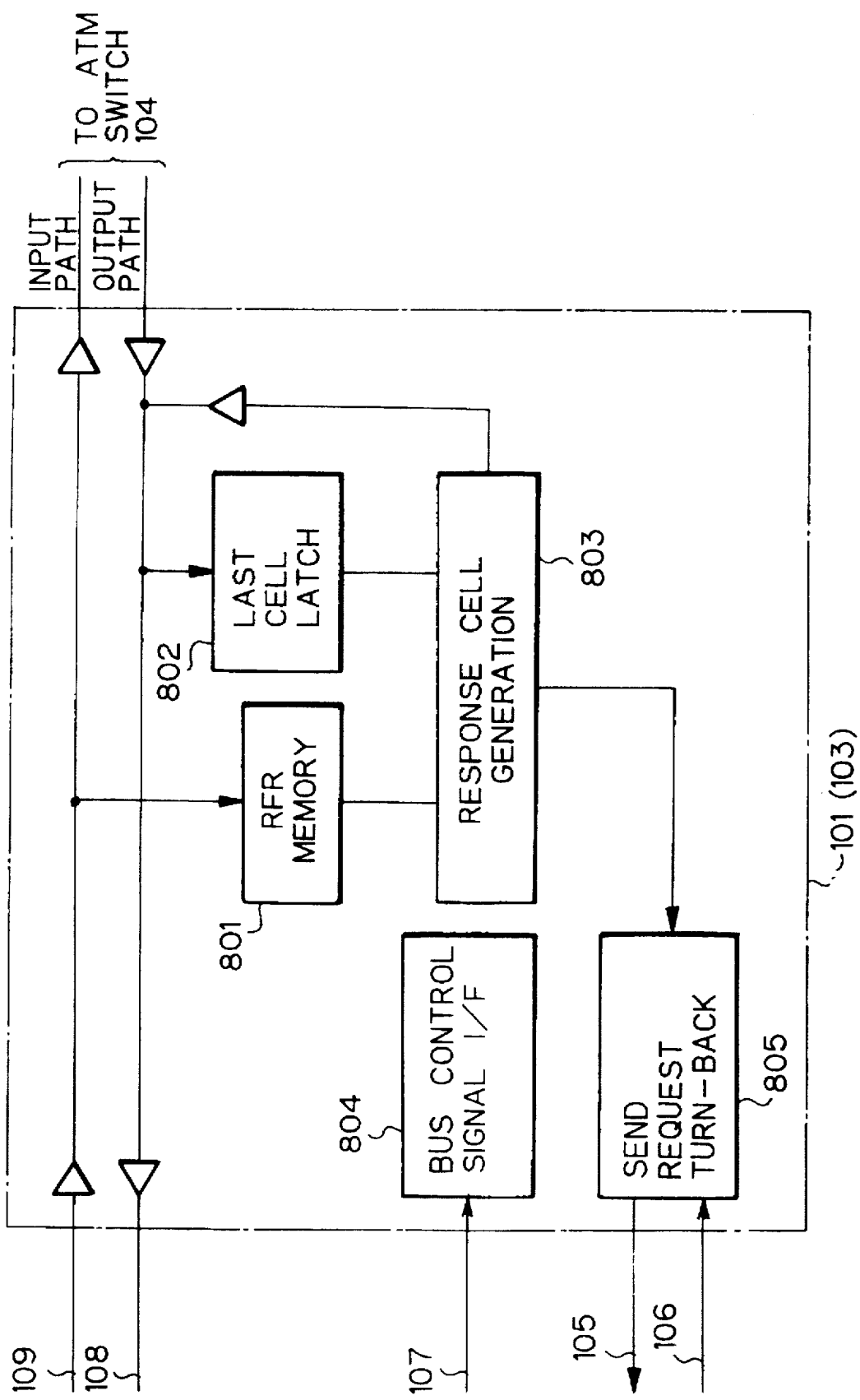
FIG. 8 is a schematic block diagram showing a bus controller included in the embodiment in detail.

Specifically, as shown in FIG. 8, each of the bus controllers 101–103 is made up of an RFR data memory 801, a last cell latch 802, a response cell generation unit 803, a bus control signal I/F 804, and a send request turn-back circuit 805. The RFR data memory 801, connected to the transmit bus 109, receives consecutive receive response data RFR from the node 100 or 102 having received the consecutive cells via the receive bus 108. The memory 801 stores the data RFR while sequentially updating them. At this instant, the address of the memory 801 is determined on the basis of the address of the source node.

The last cell latch 802 detects, among the received cells to be sent from the output path of the ATM switch 104 to the receive bus 109, the last cell represented by the more bits (M) of "11" by referencing the cell header and latches the last cell. As shown in FIG. 10 specifically, the latch 802 has a source address hold circuit H10, a destination address hold circuit H12, and a last cell detecting circuit K2. The hold circuit H10 holds the address of the source node that sent the last cell. The hold circuit H12 holds the address of the destination node. The detecting circuit K2 detects the more bits "11". The output of the circuit K2 is fed to the send request turn-back circuit 805, which will be described, in order to prevent a response cell from conflicting with cells on the transmit bus 109

Figure 4:
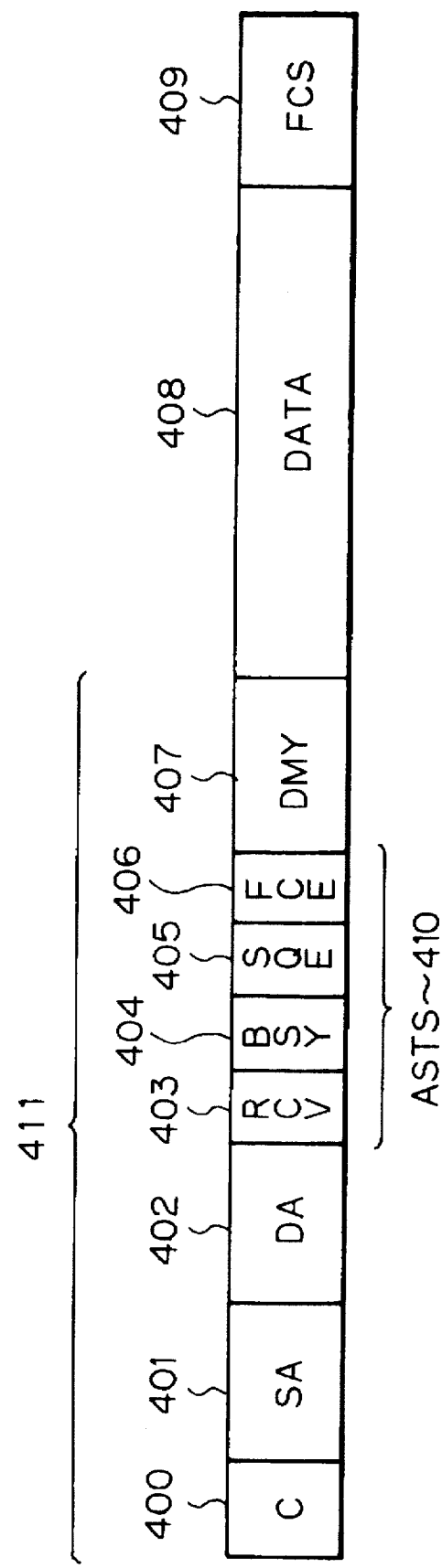
FIG. 4 shows a specific format of a response cell applicable to the embodiment.

The response cell generation unit 803 generates a response cell on the basis of the content of the last cell latch 802 and that of the RFR data memory 801 and outputs it to the input path of the ATM switch 104. As also shown in FIG. 10 specifically, the response cell generation unit 803 is implemented only by hardware, i.e., a plurality of gates G10–G18, an FCS generating or computing circuit K1, and a selector S10. The gate G10 receives "0" representative of the identifier of the response cell. The gate G11 receives the source address SA of the last cell from the hold circuit H10 of the latch 802. The third gate G12 receives the destination address DA of the last cell from the hold circuit H12. The gate G16 sequentially receives response statuses stored in the RFR data memory 801. The gate G18 receives dummy bits having any desired value. The FCS generating circuit K1 receives the outputs of the gates G10–G18, computes a cyclic code thereof, and then generates frame check sequence bits. The selector S10 sequentially selects the outputs of the gates G10–G18 and selects, in response to a timing signal T10, the output of the circuit K1. As shown in FIG. 4, the resulting response cell has a cell header 411, a data field (DATA) 408, and an FCS field 409. The cell header 411 has a cell identifier (C) 400, a source address (SA) 401, a destination address (DA) 402, an answer status (ASTS) 410, and dummy bits (DMY) 407. In this case, the cell identifier is "0". The answer status 410 reports, when the destination node has received cells, whether or not an error has occurred in the receipt to the source node. The answer status 410 has a normal receive (RCV) bit 403, a receive buffer busy (BSY) bit 404, a sequence error (SQE) bit 405, and an FCS error (FCE) bit 406. The dummy bits 407 are inserted to provide the cell header 411 with the same length as the cell header 207, FIG. 3, of the cell to be sent or received. The data field 408 may have any desired value, but it should be of the same bit length as the data field 205, FIG. 3, of the cell to be sent or received. The FCS field 409 stores the result of FCS calculations derived from the cell header 411 and response cell data 408.

Figure 10B:
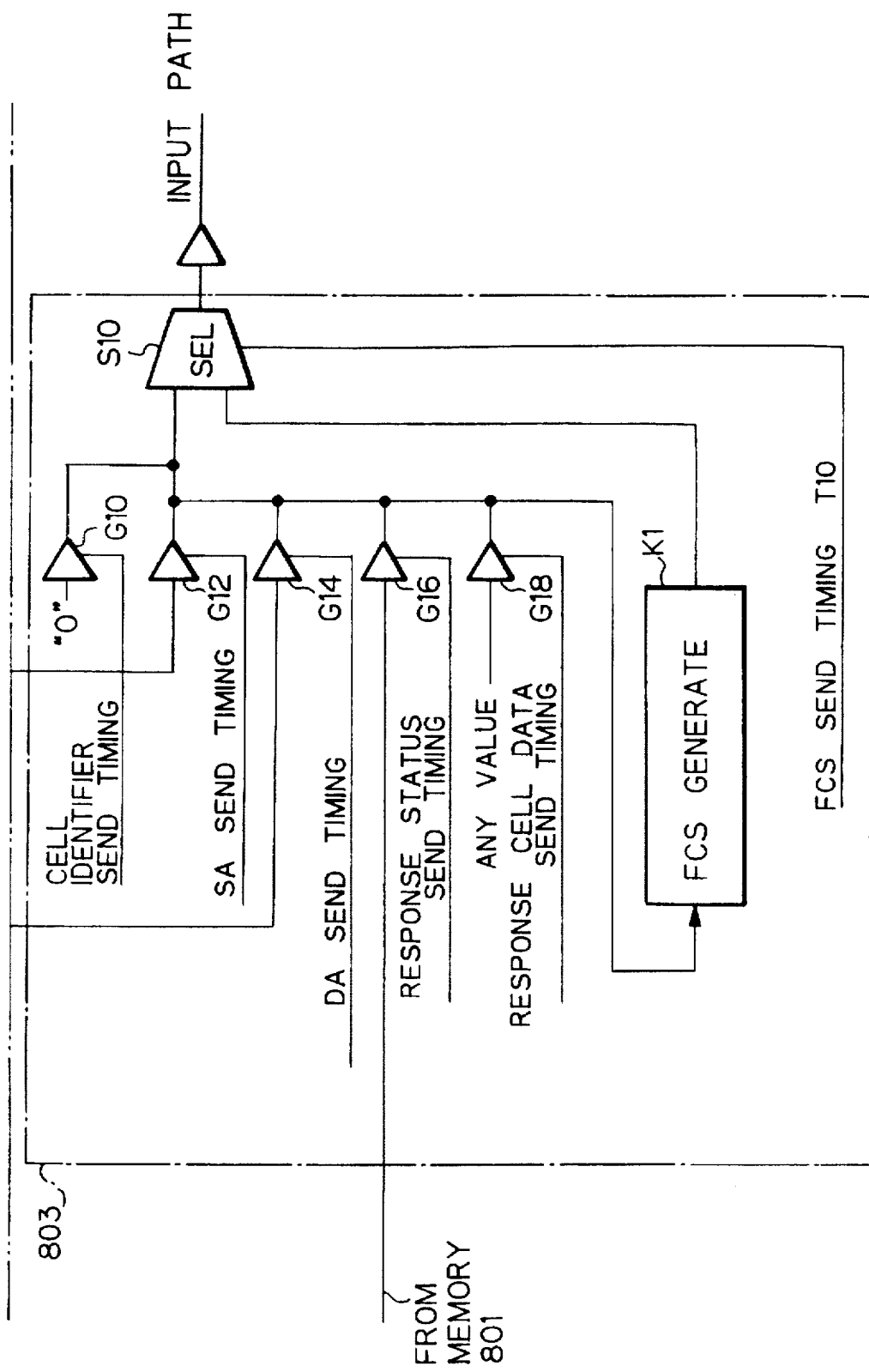

The bus control signal I/F 804 generates an enable signal for controlling the bus control line 107. The send request turn-back circuit 805 produces send request response data SRRD by adding the reject bit REJ to the send request data SRQD received over the send request line 105. Then, the circuit 805 returns the data SRRD on the send request response line 106. In the illustrative embodiment, as shown in FIGS. 10A and 10B, when a send request is present at the time of transmission of a response cell, the request is rejected in order to prevent the two cells from conflicting with each other. Specifically, a selector S12 changes the reject bit REJ in response to the output of the last cell detecting circuit K2 of the last cell latch 802. The output of the selector S12 is sent over the send request response line 106 via a gate G20.

FIG. 11 shows specific statuses of the buses 105–109. As shown, the source node 100 or 102 sends send request data SRQD to the bus controller 101 or 103 over the send request line 105. Each node 100 or 102 has a send request data output interface implemented by an open collector.

Hence, when two different nodes respectively output "1"and "0" at the same time, P the data SRQD is "0". The bus controller 101 or 103 adds the reject bit REJ ("0" in the event of rejection) to the data SRQD and then returns the resulting send request response data SRRD to the source node 100 or 102 over the send request response line 106. The cells from the source node 100 or 102 or the receive response data RFR from the node 100 or 102 are sent to the bus controller 101 or 103 over the transmit bus 109. At this instant, on the bus control line 107, the transmit data enable signal becomes "0" to indicate the position of the receive response data on the bus 109. Likewise, a receive cell from the bus controller 101 or 103 is sent to the destination node 100 or 102 over the receive bus 108; the receive data enable signal on the bus control line 107 becomes "0" to indicate the position of the cell on the bus 108.

A reference will be made to FIGS. 12–14 for describing specific operations of the embodiment. In the figures, assume that a node 00 is a source node, that a node NO is a destination node, and that a single packet is divided into three consecutive cells. FIG. 12 demonstrates how the data flow in the event of normal receipt of cells. First, at the node 00, the processor 706 feeds a transmission start request to the packet division unit 703 and right-to-send acquisition unit 704. In response, the acquisition 704 sends send request data SRQD over the transmit request line 105. In response, a bus controller 0 returns send request response data SRRD to the node 00. If the data SRRD has the same bit arrangement as the data SRQD and if the reject bit REJ included in the data SRRD is "1", meaning that the node 00 has acquired the transmission right, the processor 706 delivers a transmission command to the packet division unit 703. In response, the division unit 703 sends the first transmit cell (1) over the transmit bus 109 when the transmit data enable signal is "0". The numbers of the cells are indicated with circles in the figures. Subsequently, the division unit 703 secquentially sends the second and third transmit cells (2) and (3). On transmitting the third or last cell (3), the processor 706 causes the response timer to start counting time.

It is to be noted that the system deals with an occurrence that a plurality of nodes generate the send request data SRQD at the same time, as follows. Each node sets "1" on all the bits of the priority counter PRI when it is reset. At this instant, the node of the smallest node number sends "0" as send request data SRQD first and thereby acquires the transmission right. The node, having acquired the right, decrements the counter PRI by 1 (one) while the other nodes maintain the existing contents of their priority counters PRI. Hence, when the data SRQD is generated next, one of the nodes that failed to acquire the right last time acquires it when sending data SRQD.

A bus controller N, having received the transmit cell (1) from the source node 00, sends it to the destination node NO over the receive bus 108 as a receive cell (1). When the node NO receives the receive cell (1) normally, its packet reconstruction unit 701 checks the sequence number and frame of the cell (1) and writes the data in the receive buffer of the DM 708. Subsequently, the reconstruction unit 701 delivers the results of such a procedure to the RFR generation unit 702. In response, the generation unit 702 generates receive response data (1) (RCV="1" and BSY/SQE/FCE="0") representative of the successful receipt and sends them over the transmit bus 109.

On receiving the receive response data RFR (1), the bus controller N writes them in the address of the RFR memory 801 that corresponds to the address (SA=00) of the source node 00 generated the transmit cell (1). When the next transmit cell (2) from the node 00 arrives at the bus controller N, it is transferred to the receive bus 108 as a receive cell (2). When the node NO receives the receive cell (2) normally, it generates receive response data RFR (2) (RCV="1" and BSY/SQE/FCE="0") and outputs them to the transmit bus 109. The bus controller N writes the data RFR (2) in the same address (SA=00) of the memory 801 over the existing response data (1).

When the bus controller N receives the third or last transmit cell (3) from the node 00, it detects the cell header 207 of the cell (3). In this case, the more bits (M="11") included in the cell header are indicative of the last cell. Hence, the bus controller N writes the cell header in the last cell latch 802. The transmit cell (3) is sent to the node NO via the bus controller N as a receive cell (3). On receiving the cell (3), the node NO again causes the packet reconstruction unit 701 to check the cell (3) and deliver the results to the RFR generation unit 702. The node NO, having received the transmit cell (3) normally, sends receive response data RFR (RCV="1" and BSY/SQE/FCE ="0") to the bus controller N over the transmit bus 109. The bus controller N writes the data RFR (3) in the same address (SA=00) of the memory 801 over the existing receive response data (2). The response cell generation unit 803, having detected the last transmit cell (3), replaces the data stored in the address of the memory 801 assigned to the source address (SA=00) and the source address and destination address (DA=NO) of the last cell latch 802, thereby producing a response cell (SA=NO, DA=00, RCV="1" and BSY/SQE/FCE="0"). At the same time, the generation unit 803 sets "0" in the reject bit REJ of the send request response data SRRD. Finally, the generation unit 803 rejects the transmission from all the nodes connected to the bus controller N and sends the response cell to the ATM switch 104 via the input path N.

The bus controller 0 receives the response cell via the ATM switch 104 and then returns it to the source node 00 over the receive bus 108. On receiving the response cell, the node 00 stops the response timer thereof, writes the response status (RCV="1" and BSY/SQE/FCE="0") of the response cell and the non-occurrence of a time-out (TMO="1")in the transmission status in the DM 708, and delivers an end-of-transmission interrupt signal to the processor 706. The processor 706 reads the transmission status and recognizes that the all the data from the node 00 have been successfully received by the node NO.

Figure 13:
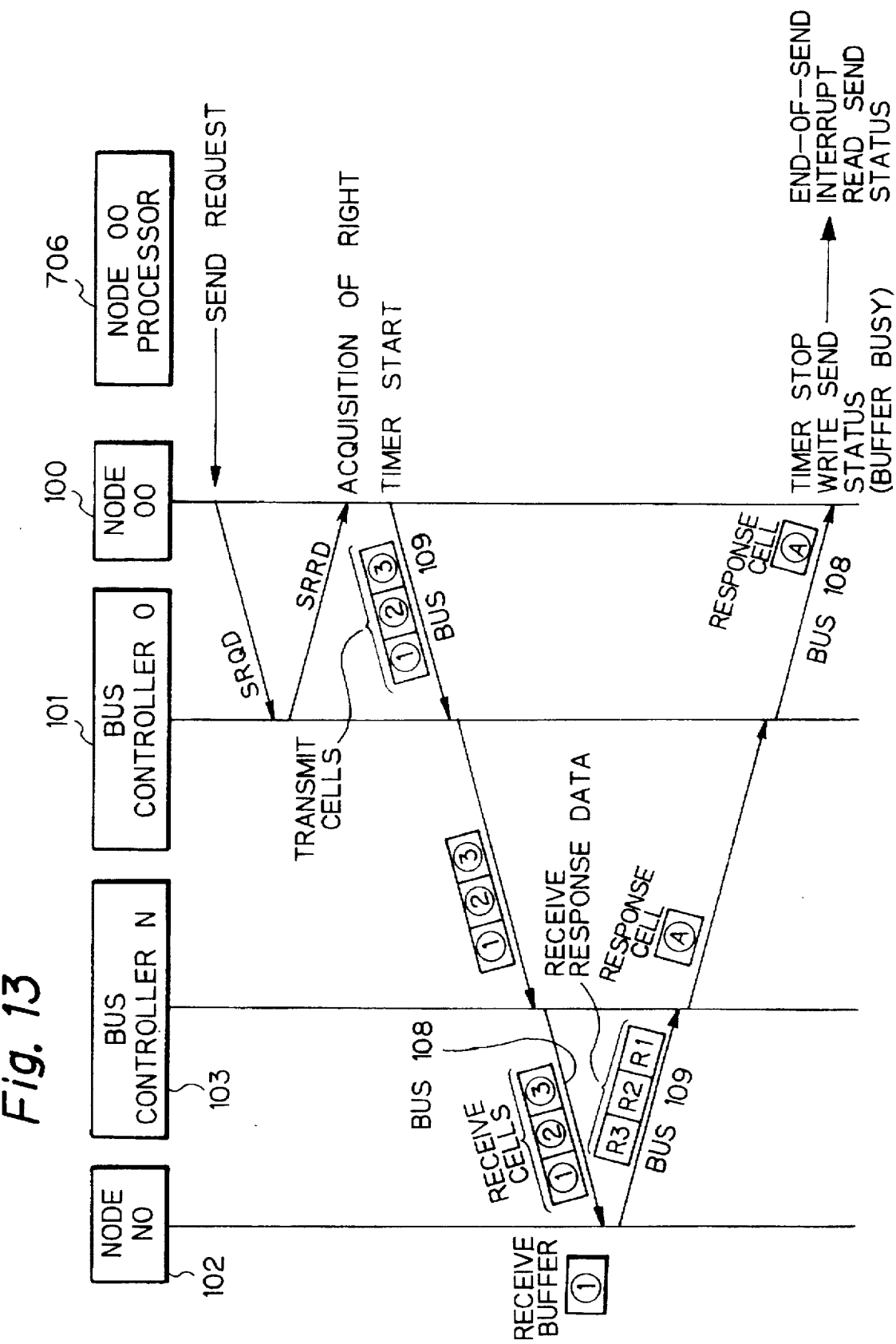
Figure 14:
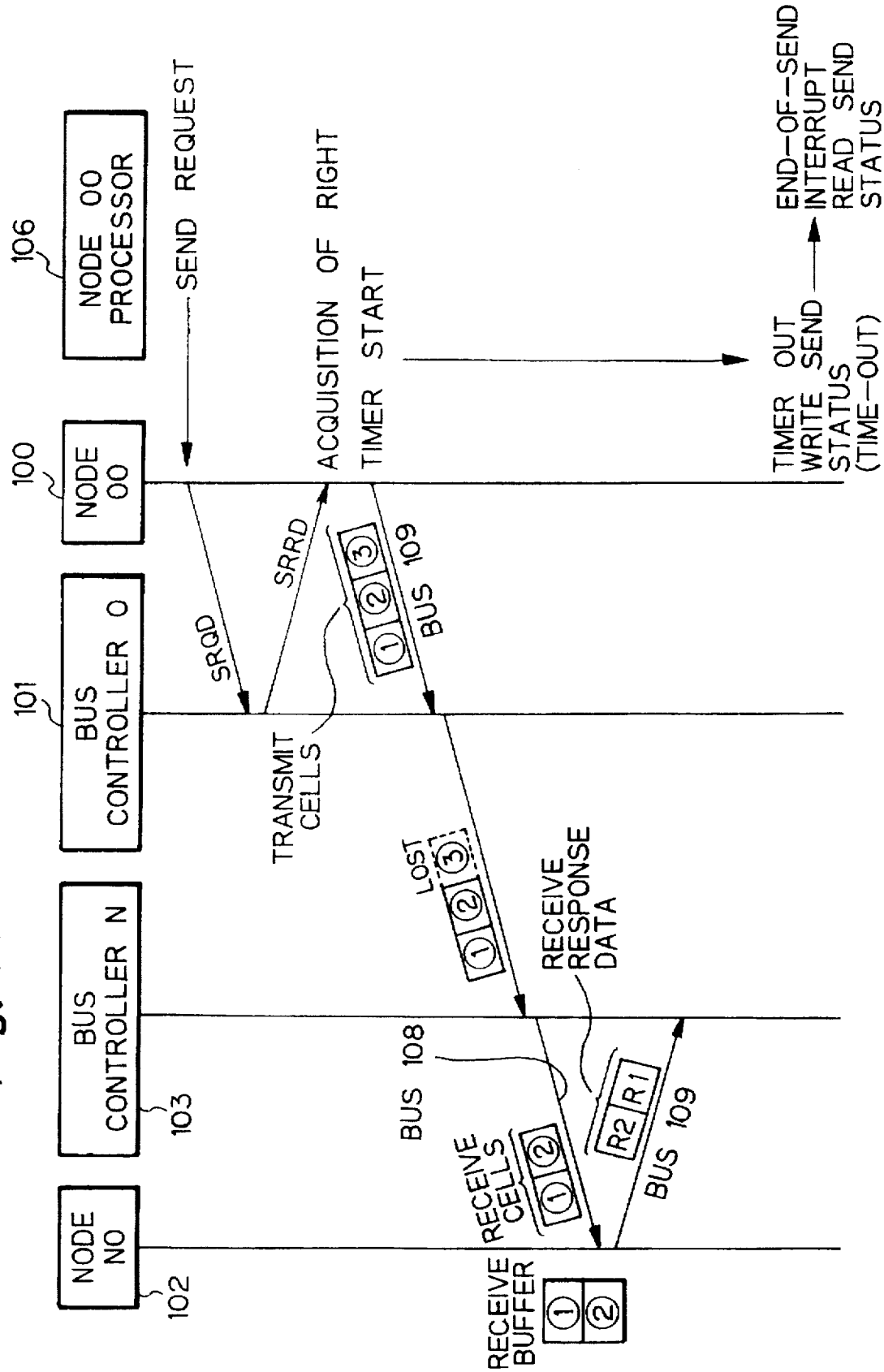

FIG. 13 shows the flow of data to occur when an error is detected during the course of receipt, e.g., when the DM 708 of the destination node NO, having received the second receive cell (2), is busy. Part of the procedure from the transmission of a send start request from the source node 00 to the arrival of the second receive cell (2) at the destination node NO is exactly the same as in the the procedure described with reference to FIG. 12. The destination node NO, having received the receive cell (2) from the bus controller N, feeds a receive buffer busy signal to the RFR generation 702 because no idle buffers are available in the DM 708. In response, the generation unit 702 generates receive response data RFR (2) (BSY="1" and RCV/SQE/FCE ="0"). The node NO sends the data RFR (2) to the bus controller N over the transmit bus 109 and stops receiving the packet. The bus controller N writes the data RFR (2) in the address (SA=00) of the RFR memory 801 assigned to the source node 00 over the existing response data (1).

When the bus controller N receives the last transmit cell (3) from the source node 00, it records the cell header of the cell (3) in the last cell latch 802 by referencing the more bits (M="11") of the cell (3), as in the previously stated procedure. The bus controller N sends the cell (3) to the destination node NO over the receive bus 108. The node NO, having stopped receiving the packet, discards the receive cell (3) and sends receive response data RFR (3) (RCV/BSY/SQE/FCE="1") to the bus controller N over the transmit bus 109. To generate the data RFR (3) indicative of the discard, the RFR generator unit 702 causes all the selectors S1–S4 to select "1" on their other inputs. The bus controller N does not write the received data RFR (3), whose bits are all "1", in the RFR memory 802. As a result, the existing or previous data RFR (2) are left in the RFR memory 802. Subsequently, the RFR cell generation unit 803 replaces the receive response data in the memory 802 and the source node address (SA=00) and destination node address (DA=00), thereby generating a response cell (SA=NO, DA=00, BSY="1" and RCV/SQE/FCE="0"). At the same time, the generation unit 803 sets "0" in the reject bit REF of the send request response data SFR. Finally, the bus controller N interrupts the transmission from all the nodes connected thereto and sends the response cell to the ATM switch 104 via the input path N.

The bus controller 0, having received the response cell via the ATM switch 104, transfers it to the source node 00 over the receive bus 108. On receiving the response cell, the node 00 stops the response timer thereof, writes the response status (BSY="1" and RCV/SQE/FCE="0") of the response cell and the non-occurrence of a time-out (TMO="0")in the transmission status of the DM 708, and delivers an end-of transmission interrupt signal to the processor 706. The processor 706 reads the transmission status and sees that the destination node NO has failed to successfully receive the packet due to the busy receive buffer. Thereafter, the node 00 waits until the receive buffer of the node NO becomes idle. As soon as the node 00 acquires the transmission right, it repeats the above procedure to send the same packet to the destination node NO.

While the above description has concentrated on the busy state of the receive buffer, the source node 00 is capable of recognizing even a sequence error or a frame check sequence error in response to the response cell.

The flow of data to occur when the response time expires due to the loss of the last cell will be described with reference to FIG. 14. Assume that the third transmit cell (3) sent from the source node 00 toward the destination node N0 is lost before it reaches the bus controller N. The procedure up to the arrival of the second receive response data RFR (2) at the bus controller N is the same as the procedure of FIG. 12 and will not be described in order to avoid redundancy. The bus controller N, having overwritten the data RFR (2) (RCV="1" and BSY/SQE/FCE="0") in the RFR memory 801, does not receive the transmit cell (3) and, therefore, does not detect more bits (M="11") indicative of the last cell. Hence, the bus controller N cannot return a response cell to the source node 00 represented by the source address (SA=00). When the predetermined period of time expires as determined by the response timer of the node 00, the occurrence of the time-out (TMO="1" and RCV/SQE/FCE=0) is written to the transmission status in the DM 708. At the same time, an end-of-transmission interrupt signal is applied to the processor 706. In response, the processor 706 recognizes that the data have not been successfully received due to the loss of the last transmit cell (3). The processor 706 repeats the above procedure later, as stated with reference to FIG. 13.

As described above, the embodiment sends a response cell to the source node by using the hardware of the destination node and that of the bus controller 100 or 103. This allows the upper layer of the source node to recognize whether an error occurred at the destination node immediately and execute a resending procedure rapidly. In addition, the source node counts a response time with a timer. Hence, when a cell from the source node is lost before arriving at the bus controller 100 or 103 at the receiving side, the source node can execute the resending procedure immediately as soon as a predetermined period of time expires.

A reference will be made to FIGS. 15–21 for describing an alternative embodiment of the packet switching system in accordance with the present invention. In the figures, like elements are designated with the same reference numerals as the preceding figures. The major difference of this embodiment from the previous embodiment is that the bus controller 100 or 103, accommodating the source node, returns send response data to the node in response to each transmit cell, thereby reporting it whether or not the transmission is successful.

Figure 16:
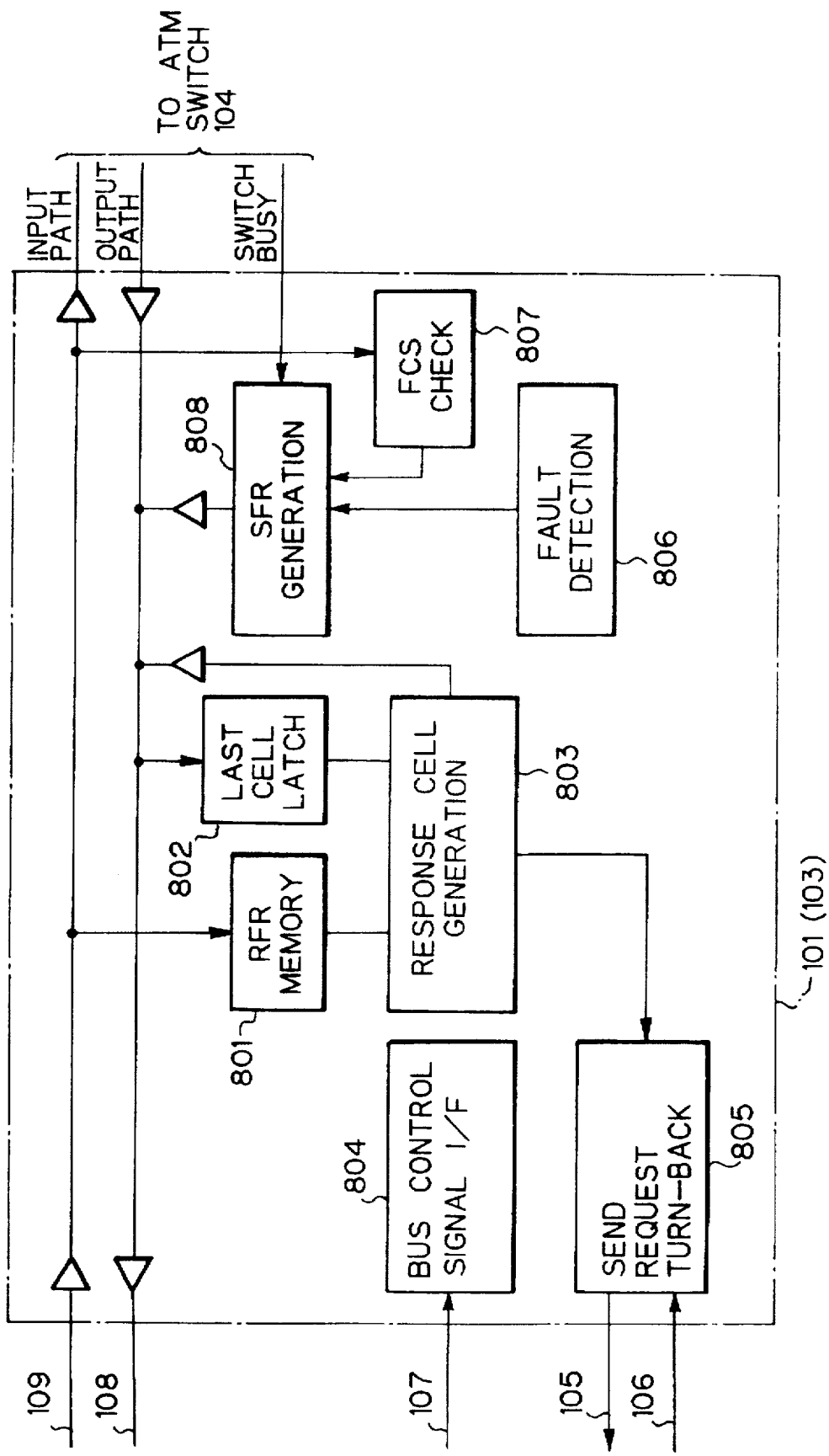
Figure 17:
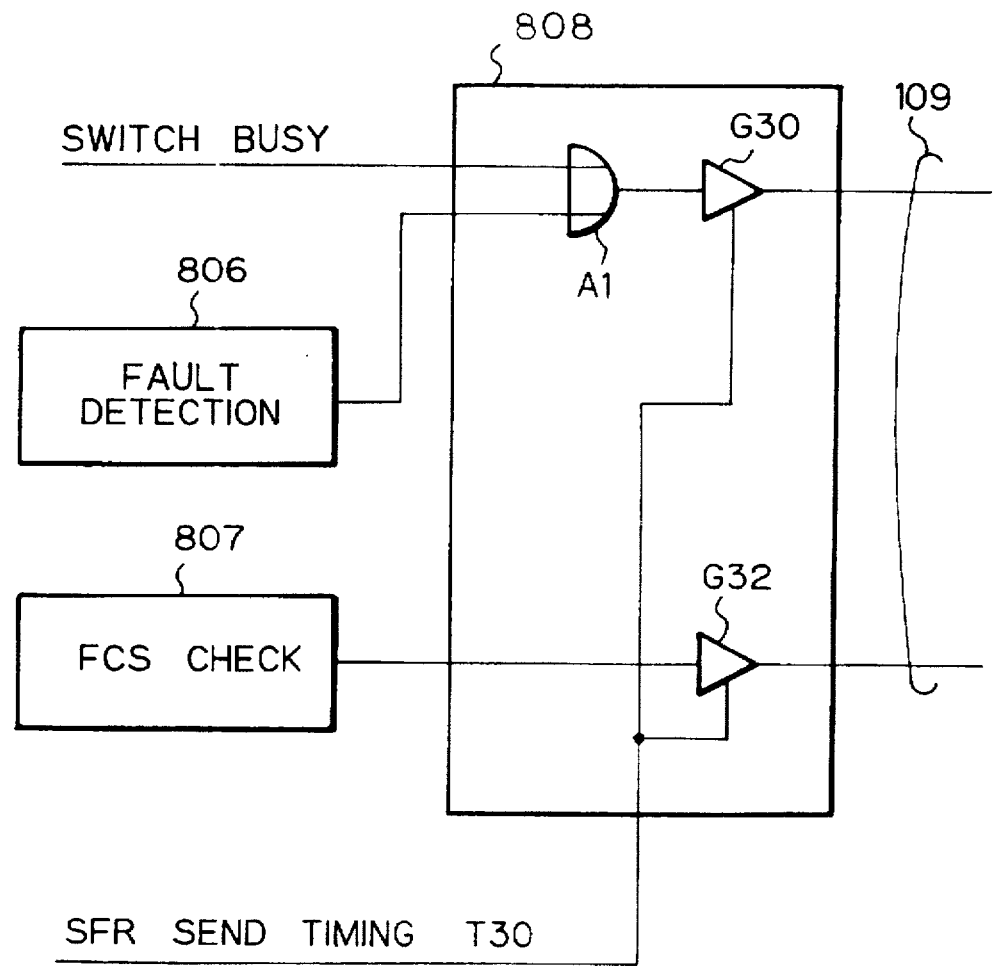
FIG. 17 is a block diagram schematically showing a send response data generating circuit included in the bus controller of FIG. 16.
Figure 18:
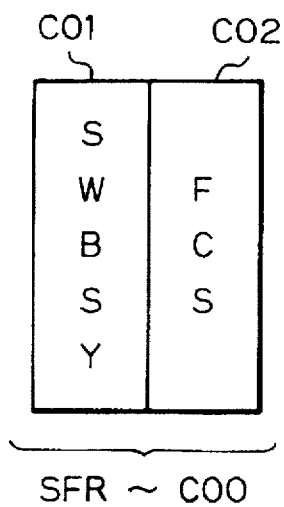
FIG. 18 shows specific send response data applicable to the alternative embodiment.

As shown in FIG. 16, the bus controller 101 or 103 has a fault detection unit 806, a frame check unit sequence (FCS) check 807, and a send response data (SFR) generation unit 808, in addition to the constituents shown in FIG. 8. The fault detection unit 806 detects the fault of the bus controller 101 or 103 itself and feeds its output to the SFR generator unit 808. The FCS check unit 807 performs FCS computation with a transmit cell detected on the transmit bus 108 and thereby determines whether or not the cell is correct. The output of the FCS check unit 807 is also applied to the SFR generation unit 808. Further, a switch busy signal is sent from the ATM switch 104 to the SFR generation unit 808. In response to these inputs, the generator 808 generates send respond data SFR in response to each transmit cell and returns them over the receive bus 109. As shown in FIG. 17 specifically, the SFR generation unit 808 generates the data SFR by hardware processing using an OR gate A1 and gates G30 and G31. The switch busy signal from the ATM switch 104 and the output of the fault detection unit 806 are applied to the inputs of the OR gate A1. The output of the OR gate A1 is connected to the corresponding bit line of the receive bus 109. The output of the FCS check unit 807 is connected to the gate G32 whose output is connected to the corresponding bit line of the receive bus 109. When a timing signal T30 is applied to the gates G30 and G32, the gates G30 and G32 are turned on to output the data SFR. As shown in FIG. 18, the data SFR has a switch busy (SWBSY) bit C01 and an FCS bit C20.

Figure 15:
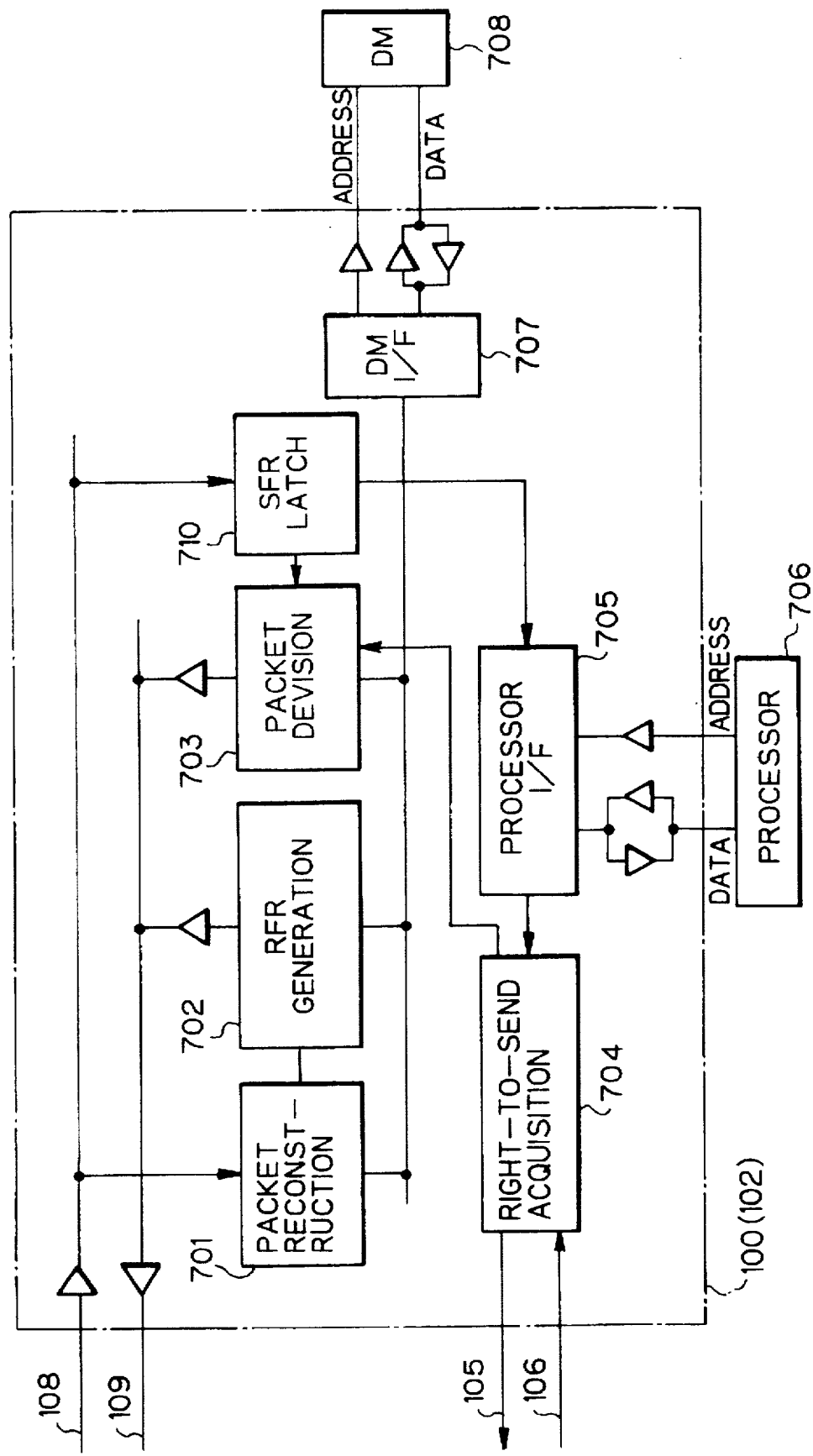
FIGS. 15 and 16 are schematic block diagrams respectively showing a node and a bus controller in accordance with an alternative embodiment of the present invention.

As shown in FIG. 15, each node of this embodiment has an SFR latch 710 in addition to the constituents shown in FIG. 7. The SFR latch 710 latches the send response data SFR received over the bus 108. If the data SFR includes any error bit, the SFR latch 710 reports it to the packet division unit 703 and processor 706 in order to cause them to stop sending cells.

Figure 19:
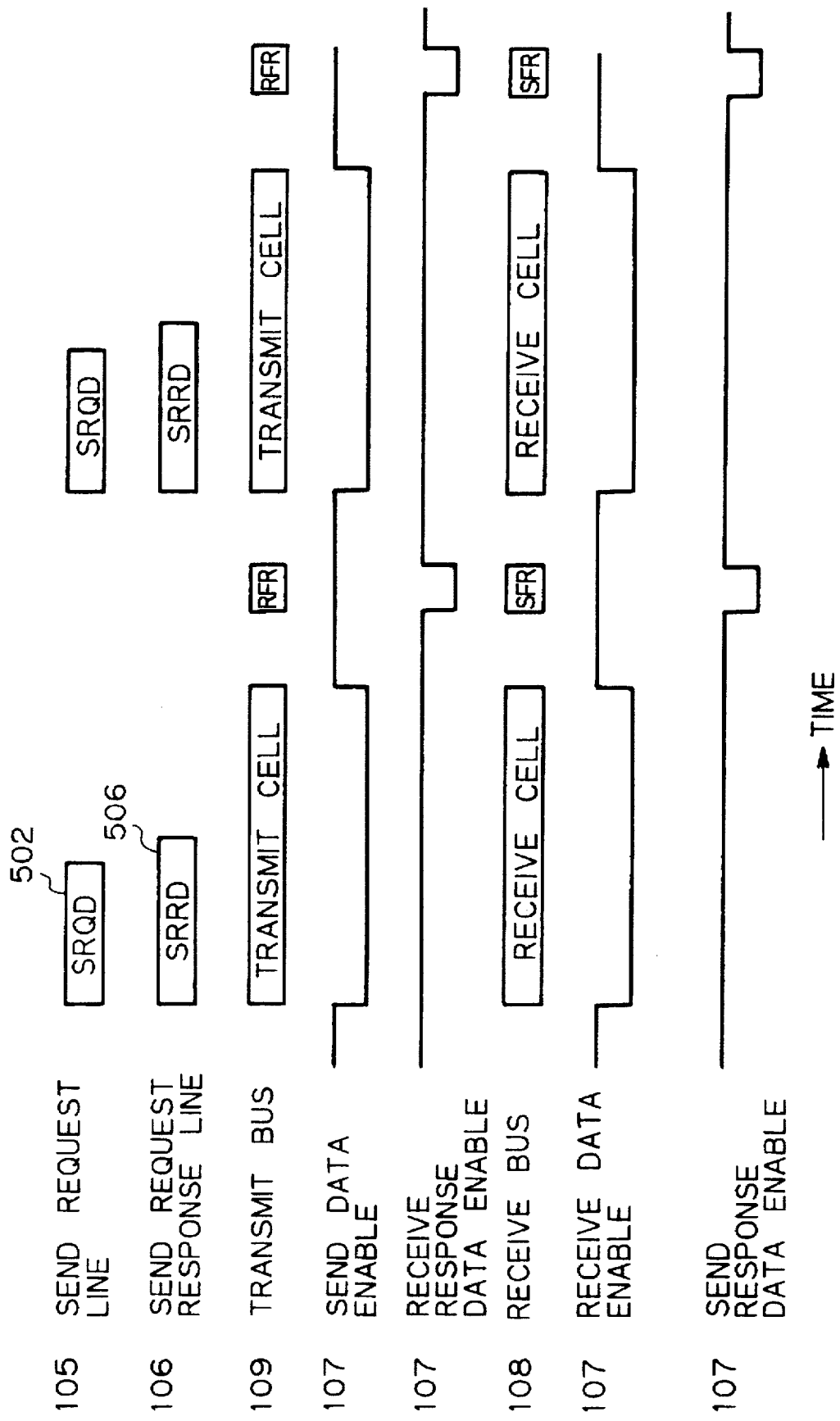
FIG. 19 is a timing chart showing specific signals appearing on buses included in the alternative embodiment.

FIG. 19 is a timing chart demonstrating specific conditions of the transmit bus 109 and receive bus 108. As shown, in this embodiment, the data SFR are sent over the receive bus 108 between consecutive receive cells in response to the send data enable signal 107.

Specific operations of this embodiment will be described with reference to FIGS. 20 and 21. Again, assume that the nodes 00 and N0 are respectively a source node and a destination mode, and that a single packet to be sent is divided into three consecutive cells.

Figure 20:
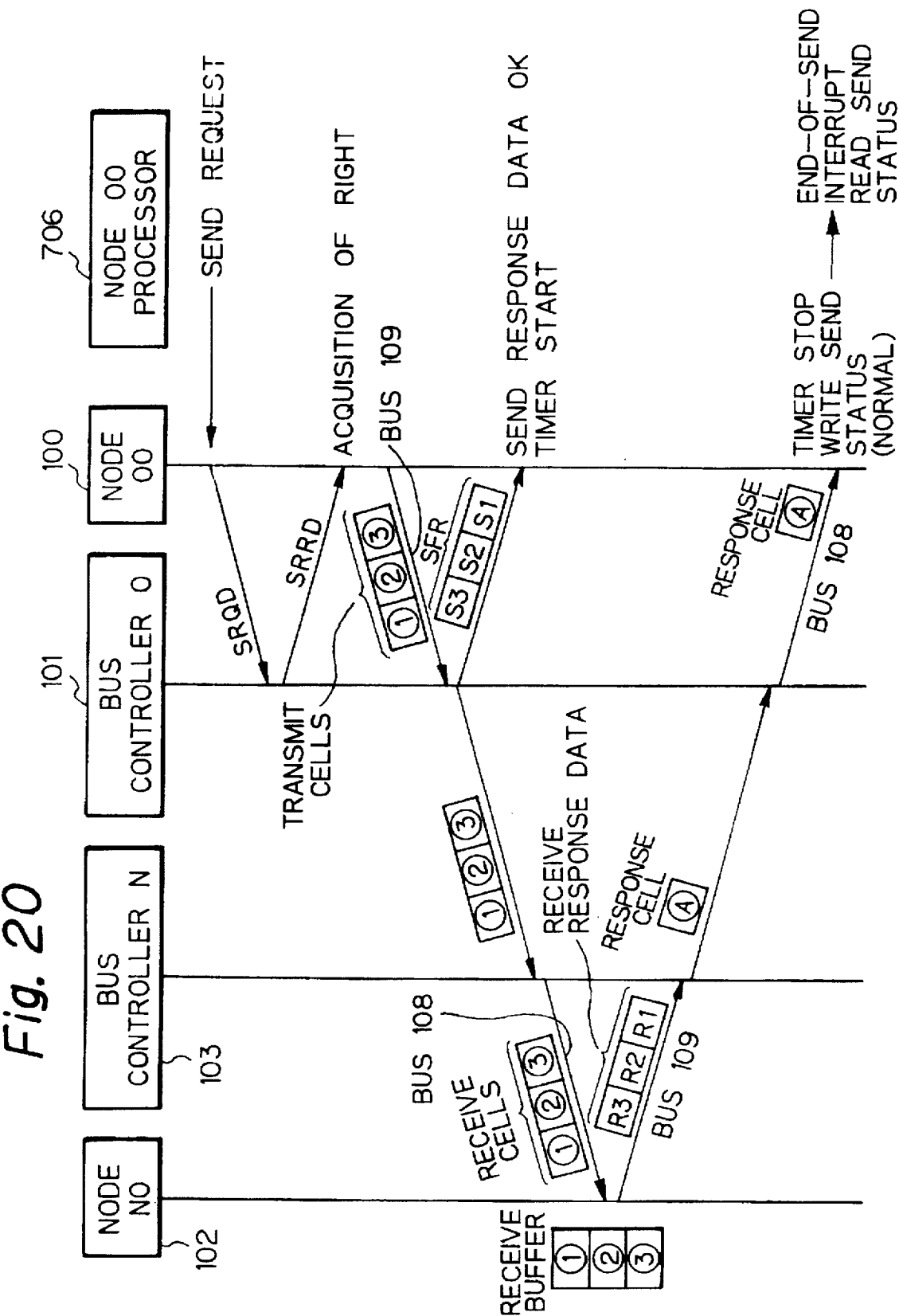
FIGS. 20 and 21 are charts each demonstrating a particular operation of the alternative embodiment.
Figure 21:
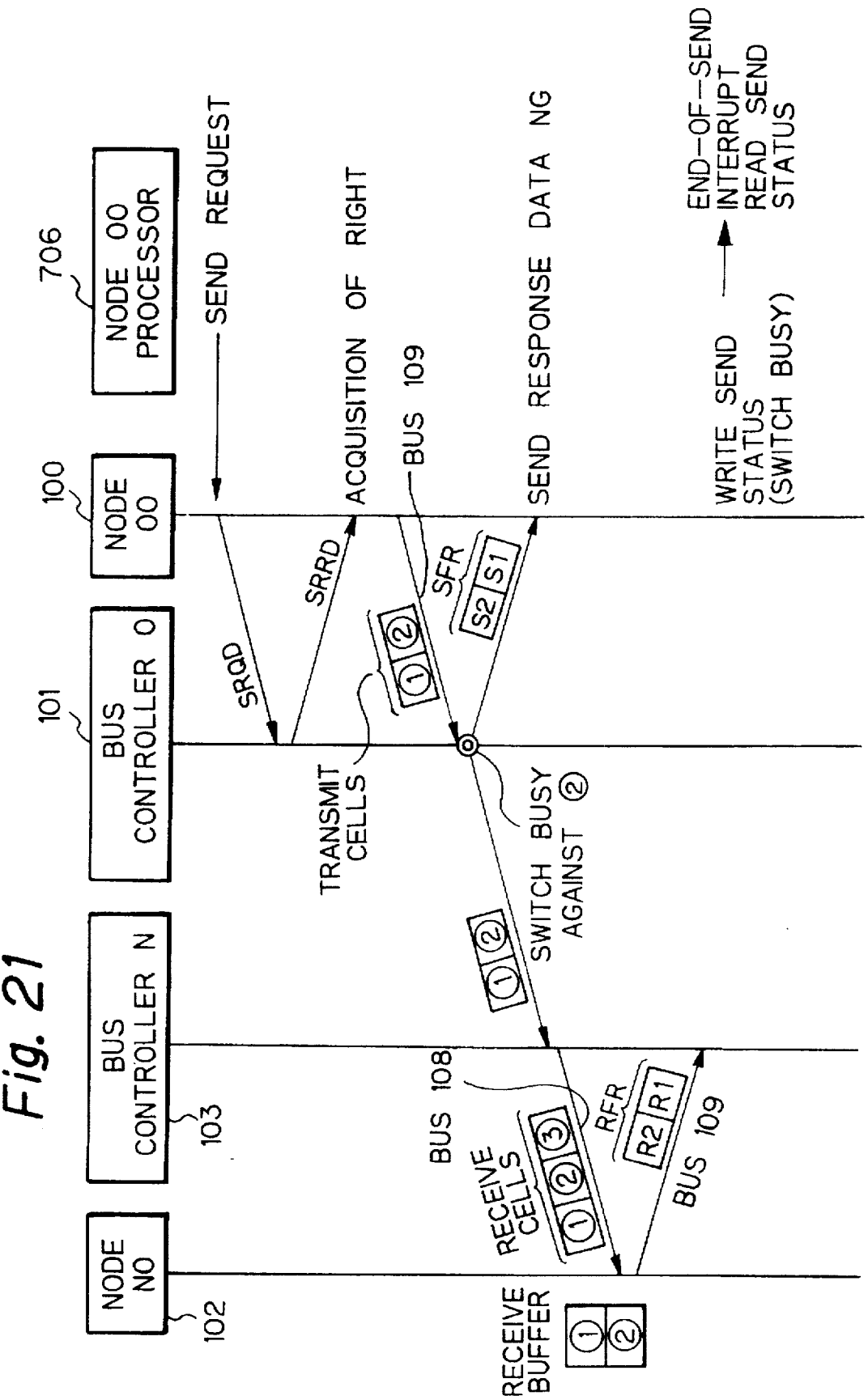

First, when the transmission from the source node 00 is normal, the procedure shown in FIG. 20 occurs. When the processor 706 of the node 00 delivers a transmission start request to the packet division unit 703 and right-to-send acquisition unit 704, the acquisition unit 704 sends send request data SRQD to the bus controller 0 over the send request line 105. In response, the bus controller 0 returns send request response data SRRD to the node 00. If the bit arrangement of the data SRRD is identical with that of the data SRQD and if the reject bit is "1", the processor 706 recognizes the acquisition of the transmission right and then delivers a transmit command to the packet division unit 703. In response, the packet division unit 703 sends the first transmit cell (1) over the transmit bus 109 when the transmit data enable signal on bus control line 107 is "0". In the bus controller 0, the FCS check unit 807 receives the cell (1), performs FCS computation, and then feeds the result of computation to the SFR generation unit 808. The generation unit 808 generates send response data SFR in response to the previously mentioned inputs including the input from the generation unit 808. In this case, the switch busy signal from the ATM switch 104 is absent, and the bus controller 0 is free from faults, and the FCS of the cell (1) is also free from errors. As a result, the bus controller 0 returns the first data SFR (1) (SWBSY/FCS="0")indicative of successful transmission to the node 00 over the receive bus 108.

Likewise, when the node 00 sends the second transmit cell (2) to the bus controller 0, the controller 0 returns the second data SFR (2) indicative of normal transmission to the node 00 over the receive bus 108. On sending the third transmit cell, the node 00 starts its response timer. In response, the bus controller 0 returns the third data SFR (3) to the node 00 indicative of normal transmission because no errors are detected. The operations of the bus controller N and destination node N0 are the same as the operations described with reference to FIG. 12 and will not be described in order to avoid redundancy.

The data to flow when, for example, the ATM switch 104 generates a switch busy signal during the course of transmission will be described with reference to FIG. 21. Assume that the ATM switch 104 generates a switch busy signal when the second transmit cell (2) from the source node 00 has arrived at the bus controller 0. Then, although the bus controller 0 is free from faults and no FCS errors are detected in the transmit cell (2), the SFR generation unit 808 generates the data SFR (2) indicative of a switch busy state (SWBSY="1" and FCS="0"). The data SFR (2) is returned to the node 00 over the receive bus 108. In response, the node 00 writes the switch busy state in the transmission status in the DM 708, ends the transmission, and delivers an end-of-transmission interrupt signal to the processor 706. The processor 706 recognizes the failure of receipt at the node NO by reading the transmission status.

As stated above, the send response data SFR allows the upper layer of the source node 00 to recognize an error immediately when it occurs in the bus controller 0 on the sending side. Hence, procedure for resending cells or for stopping the transmission can be executed at a high speed.

The illustrative embodiments have been shown and described as resending a packet in a particular type of packet switching system; they are also practicable with, for example, a LAN system or an ATM switching system only if it includes a means to generate response cells or a means to send response data.

In summary, in a packet switching system of the present invention, a source node sends a packet to a destination node by dividing it into a plurality of cells each having a fixed length. In response to each cell, the destination node sends to a communication control unit response data indicative of whether or not it has successfully received the cell. The communication control unit generates a response cell based on the response data and returns it to the source node. The source node, therefore, can determine immediately and cell by cell whether or not the receipt at the destination node has been successful. Consequently, even when an error occurs in the receipt at the destination node, the source node can resend the packet rapidly.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A method of switching packets, comprising the steps of:
    (a) at a source node, dividing a variable length of original data into pieces of data and forming a plurality of cells, each of which has a predetermined length and comprises any of the pieces of data and a header which includes a destination code, a source code, and a sequence code;
    (b) sequentially sending the plurality of cells from the source node to a destination node via a communication control unit which controls lines;
    (c) at the destination node, receiving the plurality of cells and reconstructing the variable length of original data from the plurality of cells received;
    (d) at the communication control unit, detecting the sequence code when each of the plurality of cells arrives from the source node, and detecting a last cell of the plurality of cells on the basis of the sequence code;
    (e) at the destination node, when each of the plurality of cells arrives, generating receive response data indicative of whether or not the cell has been normally received by the destination node, and returning a resulting series of receive response data sequentially to the communication control unit;
    (f) at the communication control unit, generating, upon receiving the receive response data associated with the last cell, a response cell indicative of how the plurality of cells were received at the destination node on the basis of the series of receive response data and the last cell detected; and
    (g) sending the response cell from the communication control unit to the source node to thereby notify the source node of whether or not the plurality of cells have been normally transmitted.

2. A method in accordance with claim 1, wherein in step (f) said communication control unit rejects transmission right requests from all nodes connected thereto when sending said response cell to said source node, for thereby preventing said response cell from conflicting with cells from said source node.

3. A method in accordance with claim 1, wherein in step (e) before receiving said last cell, said destination node discards, when detecting an error on receipt of a leading cell or an intervening cell, said leading cell or said intervening cell and following cells, generates receive response data for every one of the discarded cells, and sends said receive response data to said communication control unit.

4. A method in accordance with claim 3, wherein in step (f) said communication control unit sequentially stores said receive response data, except for said receive response data representative of the discarded cells, while sequentially updating said receive response data.

5. A method in accordance with claim 1, wherein said source node starts, on sending said last cell, a timer for counting a predetermined period of time, stops said timer on receiving said response cell from said communication control unit, and generates, if said response cell is not received within said predetermined period of time, data representing a response time-out status, writes said data in said memory, and reports to said control processor that said cells have not been normally transmitted.

6. A method in accordance with claim 1, wherein in step (d) said communication control unit generates send response data for every cell received from said source node to show whether or not the cell has been normally detected, and transmits said send response data to said source node; and
    wherein said source node writes, on receiving said send response data and if said send response data is representative of an error detected by said communication control unit, data representative of said error in said memory while reporting said data to said control processor.

7. A method in accordance with claim 1, further comprising a step of sequentially storing the series of receive response data at the communication control unit after step (e) has been conducted.

8. A method in accordance with claim 1, further comprising a step of writing data included in the response cell in a memory at the source node after step (g) has been conducted.

9. A method in accordance with claim 8, wherein step (g) comprises informing a control processor at the source node of whether or not the plurality of cells have been normally transmitted.

10. A method in accordance with claim 1, further comprising a step of storing the detected last cell at the communication control unit after step (d) has been conducted.

11. A method in accordance with claim 1, wherein step (e) comprises using hardware to generate the receive response data and step (f) comprises using hardware to generate the response cell.

12. A packet switching system, comprising:

a communication control unit; and a plurality of nodes, connected to and controlled by said communication control unit via lines, for switching packets via said communication control unit;

wherein each of said plurality of nodes comprises a packet transmitting circuit for dividing a variable length of original data into pieces of data, for forming a plurality of cells, each of which has a predetermined length and comprises any of the pieces of data and a header which includes a destination code, a source code, and a sequence code, and for transmitting the plurality of cells to a destination node of said plurality of nodes;

a packet receiving circuit for receiving and latching by hardware a plurality of cells transmitted by a source node of said plurality of nodes to thereby reproduce a variable length of original data sent by the source node; and a receive response data transmitting circuit connected to said packet receiving circuit for generating, for every cell received by said packet receiving circuit, receive response data indicative of whether or not the received cell has been normally received, and for sending the receive response data to said communication control unit; and wherein communication control unit comprises a last cell detecting circuit for detecting a last cell out of the plurality of cells sequentially received from the source node; and a response cell generating circuit for receiving the receive response data sent from said receive response data transmitting circuit of the destination node, for generating, on the basis of the receive response data and the last cell detected by said last cell detecting circuit, a response cell indicative of how the plurality of cells were received at the destination node, and for sending the response cell to the source node to notify said packet transmitting circuit of the source node of whether or not the plurality of cells have been normally sent.

13. A system in accordance with claim 12, wherein communication control unit further comprises a line control circuit for rejecting, when said response cell is to be sent to said source node, transmission right requests from all said nodes connected to said communication control unit for thereby preventing said response cell and said cells from said source node from conflicting with each other.

14. A system in accordance with claim 12, wherein before receiving said last cell, said packet receiving circuit discards, when a receipt error is detected on receipt of a leading cell or an intervening cell, said leading cell or said intervening cell and following cells; and wherein said receive response data transmitting circuit generates, when said packet receiving circuit discards said cells, receive response data representative of the discarded cells and sends said receive response data to said communication control unit.

15. A system in accordance with claim 12, wherein each of said plurality of nodes further comprises:

a control processor for controlling a transmission procedure and a receipt procedure; and a data memory for storing the variable length of original data to be transmitted and received data; and wherein said packet transmitting circuit reads out the variable length of original data from said data memory; and wherein said packet receiving circuit writes the variable length of original data sent by said source node into said data memory.

16. A system in accordance with claim 15, wherein said communication control unit further comprises:

a last cell storage for storing the last cell detected; and a receive response data storage for storing the receive response data sent from said receive response data transmitting circuit;

wherein said packet transmitting circuit, upon receiving the response cell from said communication control unit after a transmission of the plurality of cells, writes data includes in the response cell into said data memory and reports whether or not the transmission has ended normally to said control processor.

17. A system in accordance with claim 16, wherein said source node starts, on sending said last cell, a timer for counting a predetermined period of time, stops said timer on receiving said response cell from said communication control unit, and generates, if said response cell is not received within said predetermined period of time, data representing a response time-out status, writes said data representing a response time-out status in said data memory, and reports to said control processor that said cells have not been normally transmitted.

18. A system in accordance with claim 16, wherein said communication control unit further comprises a send response data generating circuit for generating send response data for every cell received from said source node to show whether or not the cell has been normally detected, and transmits said send response data to said source node; and wherein said source node further comprises a send response data receiving circuit for writing, on receiving said send response data and if said send response data is representative of an error detected by said communication control unit, data representative of said error in said data memory while reporting said data to said control processor.

* * * * *